US010659652B2

(12) United States Patent
Hase

(10) Patent No.: US 10,659,652 B2
(45) Date of Patent: May 19, 2020

(54) COMMUNICATION SYSTEM, COMMUNICATION DEVICE, METHOD OF CONTROLLING COMMUNICATION DEVICE, AND PROGRAM

(71) Applicant: Konica Minolta, Inc., Chiyoda-ku, Tokyo (JP)

(72) Inventor: Junichi Hase, Osaka (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/249,193

(22) Filed: Jan. 16, 2019

(65) Prior Publication Data
US 2019/0238714 A1 Aug. 1, 2019

(30) Foreign Application Priority Data
Jan. 31, 2018 (JP) ................................. 2018-015735

(51) Int. Cl.
*H04N 1/32* (2006.01)
*H04N 1/00* (2006.01)
(52) U.S. Cl.
CPC ..... *H04N 1/32694* (2013.01); *H04N 1/00244* (2013.01); *H04N 2201/0094* (2013.01)
(58) Field of Classification Search
CPC ........... H04N 1/32694; H04N 1/00244; H04N 2201/0094
See application file for complete search history.

(56) References Cited

U.S. PATENT DOCUMENTS

| 7,855,795 B2 * | 12/2010 | Ueda ..................... H04N 1/4446 358/1.14 |
| 2009/0119550 A1 * | 5/2009 | Shouno ............... H04L 41/0677 714/47.2 |
| 2010/0235499 A1 * | 9/2010 | Maki ...................... H04L 43/028 709/224 |
| 2011/0035640 A1 * | 2/2011 | Nakamura ............ H04L 1/1867 714/748 |
| 2017/0279981 A1 * | 9/2017 | Mochizuki ........... H04N 1/0001 |

FOREIGN PATENT DOCUMENTS

JP  2009-118190  5/2009

* cited by examiner

*Primary Examiner* — Neil R McLean
(74) *Attorney, Agent, or Firm* — BakerHostetler

(57) ABSTRACT

A communication device includes a hardware processor that: acquires error history information including a communication condition at a time when an error has occurred in past data communication between the communication device and an external device group and type information of the error in the past data communication; compares, in new data communication between the communication device and one external device, a first communication condition with a second communication condition; starts acquisition processing of a communication packet group related to the new data communication on condition that contents of both of the communication conditions with respect to at least one predetermined item are determined to be the same; and stores the communication packet group in a predetermined storage on condition that an error of a type same as an error type of the one error included in the error history information has occurred in the new data communication.

31 Claims, 10 Drawing Sheets

| No. | REGISTRATION DATE AND TIME | COMMUNICATION CONDITION ||| ERROR TYPE | STATUS | FILE NAME |
|---|---|---|---|---|---|---|---|
| | | TRANSMISSION DESTINATION INFORMATION | PROTOCOL | | | | |
| 1 | 2017/08/30 10:05 | 192.168.10.123 | SMB | CONNECTION ERROR | SAVED | 2017******1.cap |
| 2 | 2017/08/30 10:22 | 192.168.10.150 | FTP | OTHER COMMUNICATION ERROR | VALID | |
| 3 | 2017/08/30 10:33 | HOST-PC | SMTP | NAME RESOLUTION ERROR | VALID | |
| 4 | 2017/08/30 10:50 | 192.168.10.203 | SMB | AUTHENTICATION ERROR | VALID | |

| No. | REGISTRATION DATE AND TIME | TRANSMISSION DESTINATION INFORMATION | PROTOCOL | ERROR TYPE | STATUS | FILE NAME |
|---|---|---|---|---|---|---|
| 1 | 2017/08/30 10:05 | 192.168.10.123 | SMB | CONNECTION ERROR | VALID | |
| 2 | 2017/08/30 10:22 | 192.168.10.150 | LPD | OTHER COMMUNICATION ERROR | VALID | |
| 3 | 2017/08/30 10:33 | HOST-PC | SMTP | COMMAND ERROR | SAVED | 2017*****1.cap |
| 4 | 2017/08/30 10:50 | 192.168.10.203 | IPP | AUTHENTICATION ERROR | VALID | |

COMMUNICATION SYSTEM, COMMUNICATION DEVICE, METHOD OF CONTROLLING COMMUNICATION DEVICE, AND PROGRAM

The entire disclosure of Japanese patent Application No. 2018-015735, filed on Jan. 31, 2018, is incorporated herein by reference in its entirety.

BACKGROUND

Technological Field

The present invention relates to a communication device such as a multi-functional peripheral (MFP), and related technology.

Description of the Related Art

When a communication failure occurs in a communication network set up in a company or the like, it is required to promptly determine the cause of the communication failure and promptly resolve the communication failure.

As a technique for identifying the cause of such a communication failure, there is known a technique of acquiring a communication packet group in a network and analyzing contents of the communication packet group (communication packet analysis technique). In recent years, there is also a communication device (MFP, etc.) having a function of acquiring a communication packet group, and the communication packet group can be acquired by the communication device itself.

However, in such a technique, when all communication packets related to entire data communication are uniformly acquired and stored, there arises a problem that data storage capacity increases.

In view of the above, JP 2009-118190 A discloses the following technique.

In the technique disclosed in JP 2009-118190 A, an MFP constantly acquires communication packet data while any data communication is executed, and the acquired communication packet data is temporarily saved in units of print jobs. Thereafter, communication packet data related to the print job in which no error has occurred is deleted.

Accordingly, the communication packet data related to the print job in which no error has occurred is eventually deleted, whereby increase in data storage capacity can be suppressed.

However, according to JP 2009-118190 A, acquisition of the communication packet itself is constantly executed so that a processing load for communication packet acquisition processing constantly occurs in the MFP, whereby efficient packet acquisition processing is not necessarily performed.

SUMMARY

In view of the above, it is an object of an embodiment of the present invention to provide a technique capable of efficiently acquiring a communication packet at the occurrence of abnormality.

To achieve the abovementioned object, according to an aspect of the present invention, a communication device reflecting one aspect of the present invention comprises a hardware processor that: acquires error history information including a communication condition at a time when an error has occurred in past data communication between the communication device and an external device group and type information of the error in the past data communication; compares, in new data communication between the communication device and one external device, a first communication condition that is a communication condition at a time of the new data communication with a second communication condition that is a communication condition at a time when one past error has occurred included in the error history information; starts acquisition processing of a communication packet group related to the new data communication on condition that contents of both of the communication conditions with respect to at least one predetermined item are determined to be the same; and stores the communication packet group acquired through the acquisition processing in a predetermined storage on condition that an error of a type same as an error type of the one error included in the error history information has occurred in the new data communication.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 5 is a diagram illustrating exemplary error history information;

FIG. 8 is a diagram illustrating exemplary error history information according to the second embodiment;

DETAILED DESCRIPTION OF EMBODIMENTS

Hereinafter, one or more embodiments of the present invention will be described with reference to the drawings. However, the scope of the invention is not limited to the disclosed embodiments.

<1. First Embodiment>

<1-1. System Configuration>

Figure 1:
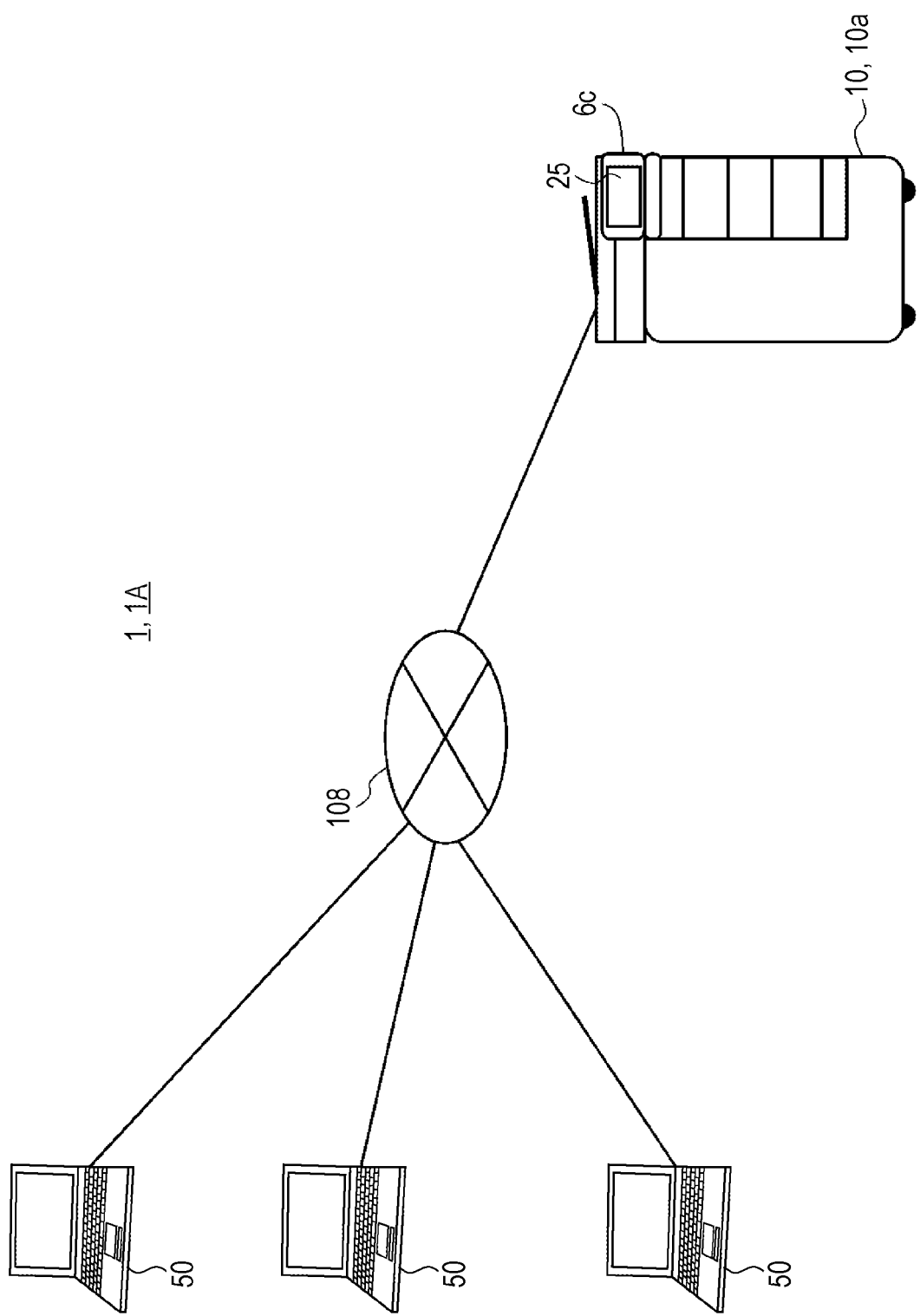
FIG. 1 is a diagram illustrating a communication system.

FIG. 1 is a diagram illustrating a communication system 1 (also referred to as 1A) according to a first embodiment of the present invention. As illustrated in FIG. 1, the communication system 1 includes a multi-functional peripheral (MFP) 10, and a plurality of communication destination device (e.g., personal computer 50). Here, the MFP 10 is exemplified as a communication device.

Elements 10, 50, etc. in the present system 1 are communicably connected to one another via a network 108. The network 108 includes a local area network (LAN), the Internet, and the like. A connection mode to the network 108 may be a wired connection or a wireless connection.

In the present embodiment, the MFP 10 executes processing of acquiring and storing a communication packet group in data communication (network transmission of a scanned image, etc.) with another device (50, etc.).

Specifically, as will be described later, a communication condition E1 at the time of the current data communication and a communication condition E2 at the time of occurrence of one error in the past included in error history information 210 (FIG. 5) (both communication conditions) are compared with each other. Then, acquisition of the communication packet group related to the current data communication is started on condition that contents of both of the communication conditions of E1 and E2 with respect to at least one predetermined item ("communication destination device", etc.) are determined to be the same. Thereafter, in a case where an error (more specifically, error of the type same as the one error in the past) occurs in the current data communication, the acquired communication packet group is stored in the storage 5. Accordingly, very efficient acquisition processing and storage processing of the communication packet group are implemented. These operations will be described in detail later.

Figure 2:
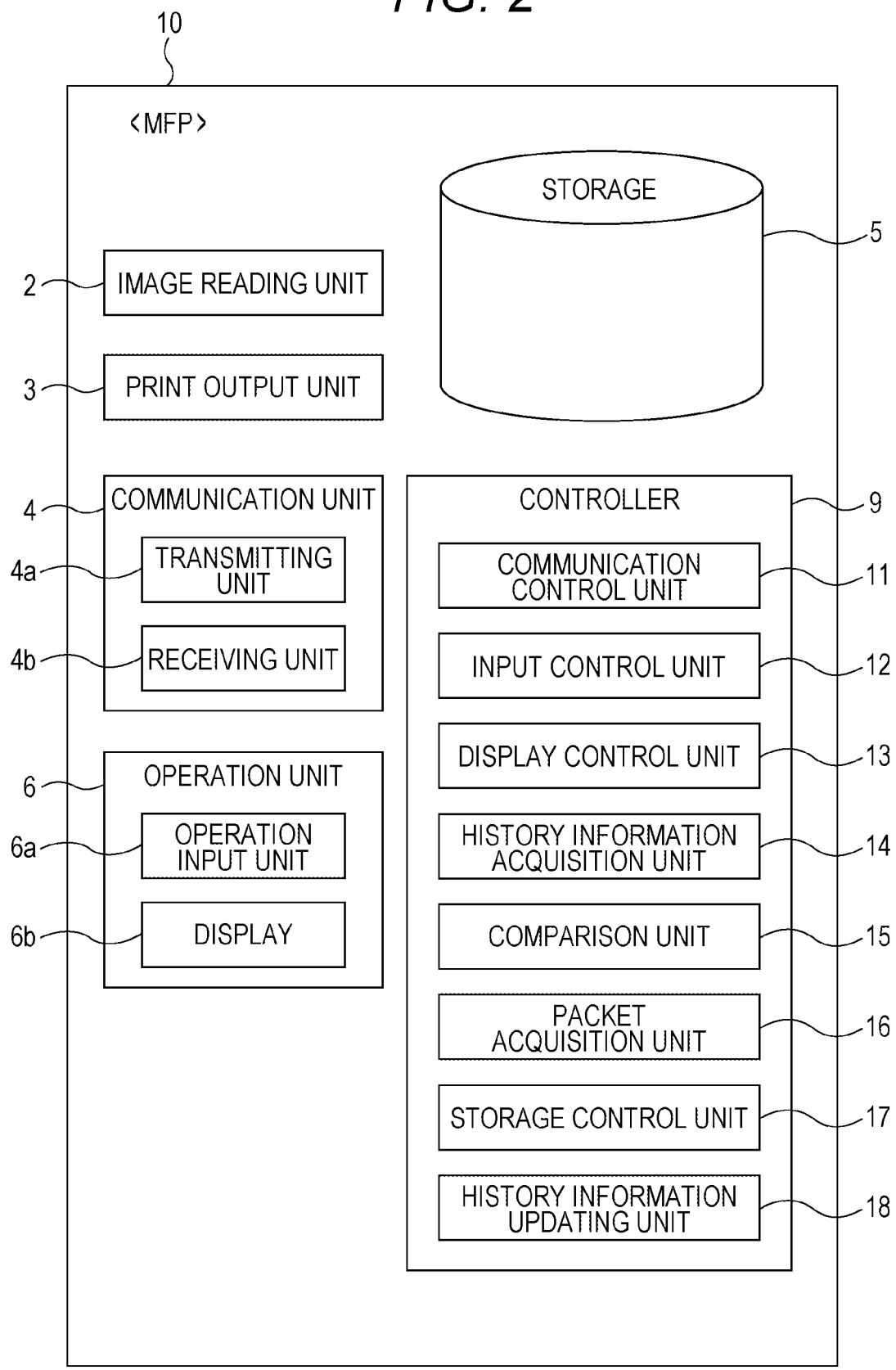
FIG. 2 is a diagram illustrating functional blocks of an MFP.

FIG. 2 is a diagram illustrating functional blocks of the MFP 10.

The MFP 10 is an apparatus (also referred to as multi-function machine) having a scanning function, a copy function, a facsimile function, a box storage function, a web browser function, and the like. Specifically, as illustrated in the functional block diagram in FIG. 2, the MFP 10 includes an image reading unit 2, a print output unit 3, a communication unit 4, a storage 5, an operation unit 6, a controller (control unit) 9, and the like, and those units are operated in a composite manner to provide various functions. The MFP 10 is also referred to as an image processing apparatus, an image forming apparatus, or the like.

The image reading unit 2 is a processing unit that optically reads (i.e., scans) a document placed at a predetermined position of the MFP 10 and generates image data (also referred to as a document image or a scanned image) of the document.

The print output unit 3 is an output unit that prints and outputs an image on various media such as paper on the basis of the data related to an object to be printed (data to be printed).

The communication unit 4 is a processing unit capable of performing facsimile communication via a public line or the like. In addition, the communication unit 4 is capable of performing network communication via the network 108. In this network communication, for example, various protocols such as the transmission control protocol/internet protocol (TCP/IP) are used. Using the network communication, the MFP 10 can exchange various data with a desired destination (computer 50, various servers, etc.). The communication unit 4 includes a transmitting unit 4a that transmits various data, and a receiving unit 4b that receives various data.

The storage 5 includes a storage device such as a hard disk drive (HDD) and a semiconductor memory. The storage 5 stores the error history information 210 (to be described later), and the like. The error history information 210 includes communication conditions at the time of occurrence of an error in the past related to the network communication between the MFP 10 and an external device group (one or a plurality of devices (computer 50, etc.)) (communication setting of the MFP10, etc.), type information associated with the error in the past, and the like. Further, the storage 5 also stores a communication packet and the like acquired for analyzing communication errors.

The operation unit 6 includes an operation input unit 6a that receives an operation input to the MFP 10, and a display 6b that displays and outputs various information.

A substantially plate-shaped operation panel 6c (see FIG. 1) is provided on the MFP 10. In addition, the operation panel 6c includes a touch panel 25 (see FIG. 1) on the front surface thereof. The touch panel 25 functions as a part of the operation input unit 6a, and also functions as a part of the display 6b. The touch panel 25 is configured by a liquid crystal display panel having various sensors embedded therein, and is capable of displaying various information and receiving various operation inputs from an operating user.

The controller 9 is a control device incorporated in the MFP 10, which comprehensively controls the MFP 10. The controller 9 is configured as a computer system including a central processing unit (CPU) (also referred to as microprocessor or computer processor), various semiconductor memories (RAM and ROM), and the like. The controller 9 implements various processing units by executing a predetermined software program (hereinafter, also simply referred to as program) stored in the ROM (e.g., EEPROM (registered trademark)) in the CPU. Note that the program (more specifically, program module group) may be recorded in a portable recording medium such as a USB memory, read out from the recording medium, and installed in the MFP 10. Alternatively, the program may be downloaded via the network 108 or the like and installed in the MFP 10.

Specifically, as illustrated in FIG. 2, the controller 9 implements, by executing the program, various processing units including a communication control unit 11, an input control unit 12, a display control unit 13, a history information acquisition unit 14, a comparison unit 15, a packet acquisition unit 16, a storage control unit 17, and a history information updating unit 18.

The communication control unit 11 is a processing unit that controls communication operation with another device (computer 50, etc.) in cooperation with the communication unit 4 and the like. The communication control unit 11 includes a transmission control unit that controls transmission operation of various data, and a reception control unit that controls reception operation of various data.

The input control unit 12 is a control unit that controls operational input operation on the operation input unit 6a (touch panel 25, etc.). For example, the input control unit 12 controls operation of receiving operational input on an operation screen displayed on the touch panel 25.

The display control unit 13 is a processing unit that controls display operation of the display 6b (touch panel 25, etc.).

The history information acquisition unit 14 is a processing unit that acquires, from the storage 5 or the like, error history information 210 (see FIG. 5) stored in the storage 5 or the like. The error history information 210 is information including information at the time of occurrence of an error in the past related to the network communication (data communication) between the MFP 10 and the external device group (50, etc.) (specifically, information associated with communication conditions (communication settings etc. of the MFP 10), and information associated with a type of the error (communication error) in the past (error type information)).

Note that the error history information 210 is stored in the storage 5 in the MFP 10 in the present embodiment. More specifically, the error history information 210 is recorded in the storage device (HDD, semiconductor memory (solid state drive (SSD), flash memory, and RAM), etc.) built in the MFP 10. However, it is not limited thereto, and the error history information 210 may be recorded in a storage device (USB memory, etc.) externally attached to the MFP 10. Alternatively, the error history information 210 may be stored in, instead of the storage 5 in the MFP 10, a storage or the like in an external device (e.g., server 70 (see FIG. 9, etc.)(to be described later)) capable of communicating with the MFP 10. Note that, although the error history information 210 may be recorded in a volatile storage device, it is preferably recorded in a non-volatile storage device.

The comparison unit 15 is a processing unit that compares both communication conditions of the communication condition E2 at the time of occurrence of one error in the past included in the error history information 210 and the communication condition E1 at the time of the current data communication.

The packet acquisition unit 16 is a processing unit that controls acquisition operation of a communication packet (more specifically, communication packet group) in the current data communication. The packet acquisition unit 16 starts the acquisition operation of the communication packet group related to the current data communication on condition that contents with respect to at least one predetermined item are determined to be the same in both of the communication conditions E1 and E2 (contents of both of the communication conditions of E1 and E2 with respect to at least one predetermined item are determined to be the same).

The storage control unit 17 is a processing unit that controls storage operation of the acquired packet. The storage control unit 17 stores the communication packet group acquired in the current data communication in a predetermined storage on condition that an error of the type same as the error type of one error included in the error history information has occurred in the current data communication.

Note that the storage 5 in the MFP 10 is mainly exemplified as the predetermined storage in the present embodiment. More specifically, the communication packet group acquired in the current data communication is recorded in the storage device (HDD, semiconductor memory (SSD, flash memory, and RAM), etc.) built in the MFP 10. However, it is not limited thereto, and the communication packet group acquired in the current data communication may be recorded in a storage device (USB memory, etc.) externally attached to the MFP 10. Alternatively, the communication packet group acquired in the current data communication may be stored in, instead of the storage 5 in the MFP 10, a storage or the like in an external device (e.g., server 70 (see FIG. 9. etc.)) capable of communicating with the MFP 10. Note that, although the communication packet group may be recorded in a volatile storage device, it is preferably recorded in a non-volatile storage device.

The history information updating unit 18 is a processing unit that accesses the error history information 210 (see FIG. 5) and updates contents of the error history information 210.

Note that, although the above-described various operations are executed by mainly executing the software program using the CPU of the controller 9, it is not limited thereto, and the above-described various operations may be executed using a dedicated hardware or the like provided in the MFP 10 (more specifically, inside or outside the controller 9). For example, all or a part of the communication control unit 11, the input control unit 12, the display control unit 13, the comparison unit 15, the packet acquisition unit 16, the storage control unit 17, the history information updating unit 18 (FIG. 2), and the like may be implemented using one or a plurality of dedicated hardware.

<1-2. Error History Information>

Next, the error history information 210 will be described. FIG. 5 is a diagram illustrating an example of the error history information 210. In the error history information 210, information associated with an error occurred in at least one past data communication (a plurality of times of data communication in FIG. 5) is recorded. The error history information 210 is stored in the storage 5 of the MFP 10.

In the error history information 210 in FIG. 5, for each of a plurality of errors occurred in the plurality of times of data communication, contents related to a plurality of items ("number (No.)", "registration date and time (error occurrence date and time)", "transmission destination information", "protocol", "error type", "status", "file name", etc.) are recorded. In addition, each data of each row (also referred to as data record) includes information related to one error (more specifically, information related to a plurality of items of the one error).

The above-mentioned plurality of items related to each data record includes a communication condition at the time of occurrence of an error in the past (communication settings in the MFP 10, etc.) (in this case, "transmission destination information" and "protocol"). In the "transmission destination information" column, information related to the communication destination device at the time of occurrence of an error in the past (IP address, host name, and/or domain name, etc.) is recorded. Further, in the "protocol" column, information related to a type of the protocol (communication protocol) used at the time of occurrence of an error in the past is recorded. Examples of the protocol type include a file transfer protocol (FTP), a server message block (SMB), a simple mail transfer protocol (SMTP), a web-based distributed authoring and versioning (WebDAV), a line printer daemon (LPD), and an Internet printing protocol (IPP).

In addition, the plurality of items also includes type information related to a past error (communication error) ("error type"), and the like. Examples of the "error type" include a "connection error" (error that occurs when a communication port of a communication destination device is closed, etc.), "name resolution error", "authentication error", "command error", and "other communication error".

In addition, the plurality of items also includes the "file name" and the "status".

The "file name" is a column indicating a file name (and folder path name) of a data file for recording a communication packet. In the data file, contents of a communication packet group acquired in another data communication (error occurrence communication) after the past data communication are written. More specifically, in the data file, contents of a communication packet group acquired in another data communication (same condition abnormal communication (to be described later)) after occurrence of one error corresponding to one data record are written. The data file is generated for each data communication. Note that, in a case where the data file is stored in a device other than the MFP 10, a name of the storage destination device of the data file may also be recorded. The name of the storage destination device of the data file may be included in a folder path name, or may be recorded separately from the folder path name.

Moreover, the "status" is a flag column for controlling, for example, propriety of duplicate saving of a plurality of communication packet groups acquired with respect to a plurality of errors of the same type. In other words, a value of the item "status" ("saved"/"valid") is used as information or the like for controlling whether or not to save error information further. Specifically, when a certain type of error occurs, first (initially), the value "valid" is recorded in the item "status" of the error. Thereafter, when information related to the communication packet group associated with the error is stored (saved) upon occurrence of an error related to the certain type of error, the item value of the item "status" is changed from "valid" to "saved". After the change to "saved", no further storage operation is executed even if the same type of error occurs. According to such control, only the communication packet group related to one error is stored with respect to the same type of error.

A value in the "status" column is also referred to as storage result information (or save result information) indicating whether the communication packet group related to the "same condition abnormal communication" (to be described next) has already been acquired and stored (saved as a file). The value "saved" indicates that the communication packet group has already been acquired and stored (saved as a file) (and that the communication condition of the data record is not valid with respect to comparison processing (step S13)). Further, the value "valid" indicates that the communication packet group has not been saved yet as a file (and that the communication condition of the data record is valid with respect to the comparison processing (step S13)). Note that the "same condition abnormal communication" is data communication in which the communication condition with respect to at least one predetermined item (e.g., "communication destination device") includes contents same as the communication condition E2 (communication condition E2 of any data record in the error history information 210) in the past data communication, which is data communication executed with an error (abnormality) occurred between the past data communication and the current data communication (another past data communication different from the past data).

For example, in FIG. 5, in the uppermost data record (No. 1), the registration date and time "30 Aug. 2017 at 10:05", the transmission destination information (IP address) "192.168.10.123", the protocol "SMB", the error type "connection error", the status "saved", and the file name "2017***1.cap" are recorded. In this data record (No. 1), it is indicated that the "connection error" has occurred in the past data communication including the communication condition such as the transmission destination information "192.168.10.123". In addition, it is also indicated that the communication packet group related to the same condition abnormal communication corresponding to the data record has already been stored in the data file (data file having the file name "2017***1.cap") (status "saved").

In the next data record (data record in the second row from the top), the registration date and time "30 Aug. 2017 at 10:22", the transmission destination information (IP address) "192.168.10.150", the protocol "FTP", the error type "other communication error", and the status "valid" are recorded, and a file name has not been recorded. In this data record (No. 2). it is indicated that the "other communication error" has occurred in the past data communication including the communication condition such as the transmission destination information "192.168.10.150". In addition, it is also indicated that the communication packet group related to the same condition abnormal communication corresponding to the data record has not been stored (status "valid").

Note that various kinds of information are recorded also in other data records.

<1-3. Operation>

As described above, the MFP 10 executes processing of acquiring the communication packet group related to the data communication with another device (50, etc.), storing (saving) it, and the like.

Figure 3:
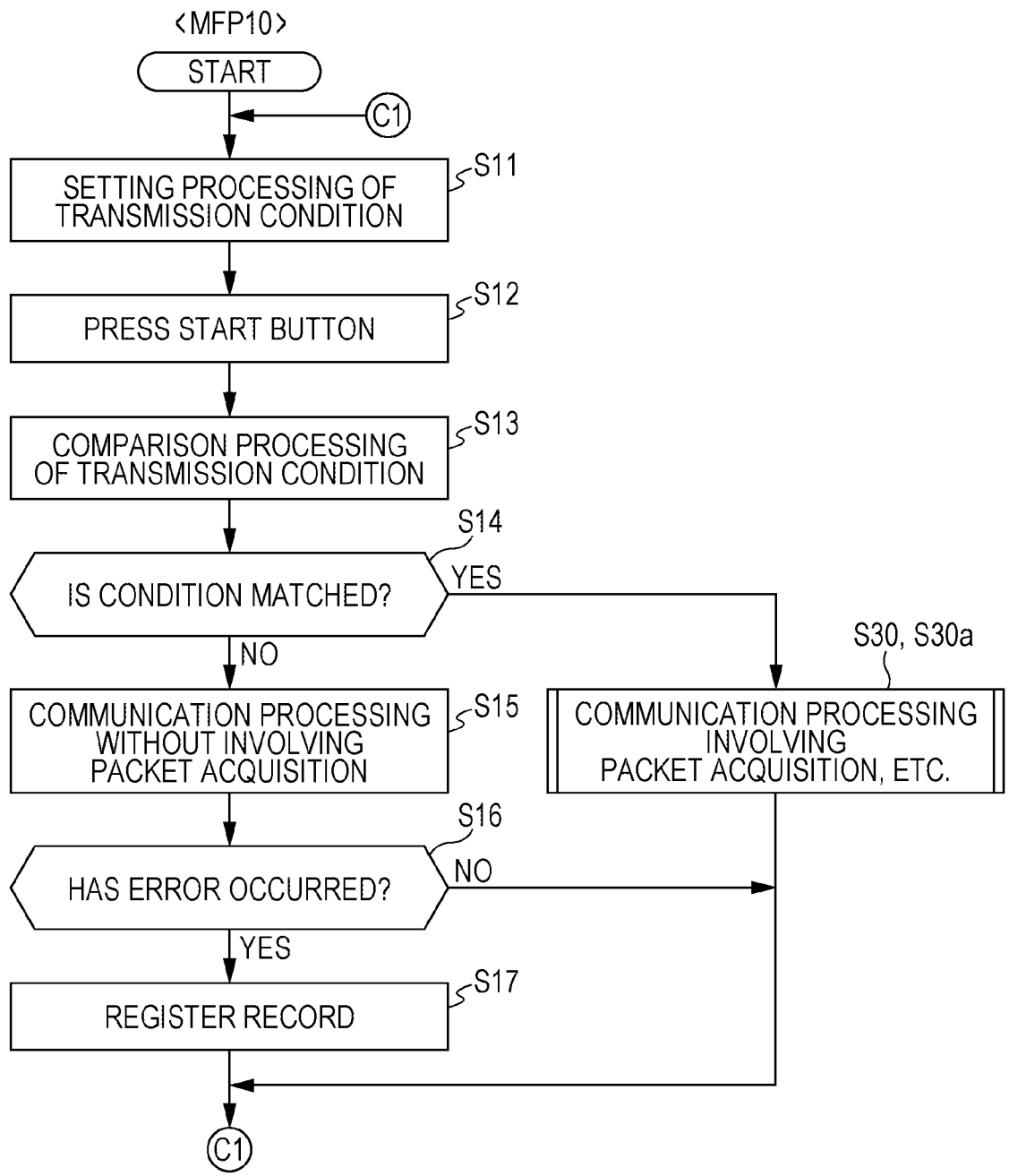
FIG. 3 is a flowchart illustrating operation of an MFP according to a first embodiment.
Figure 4:
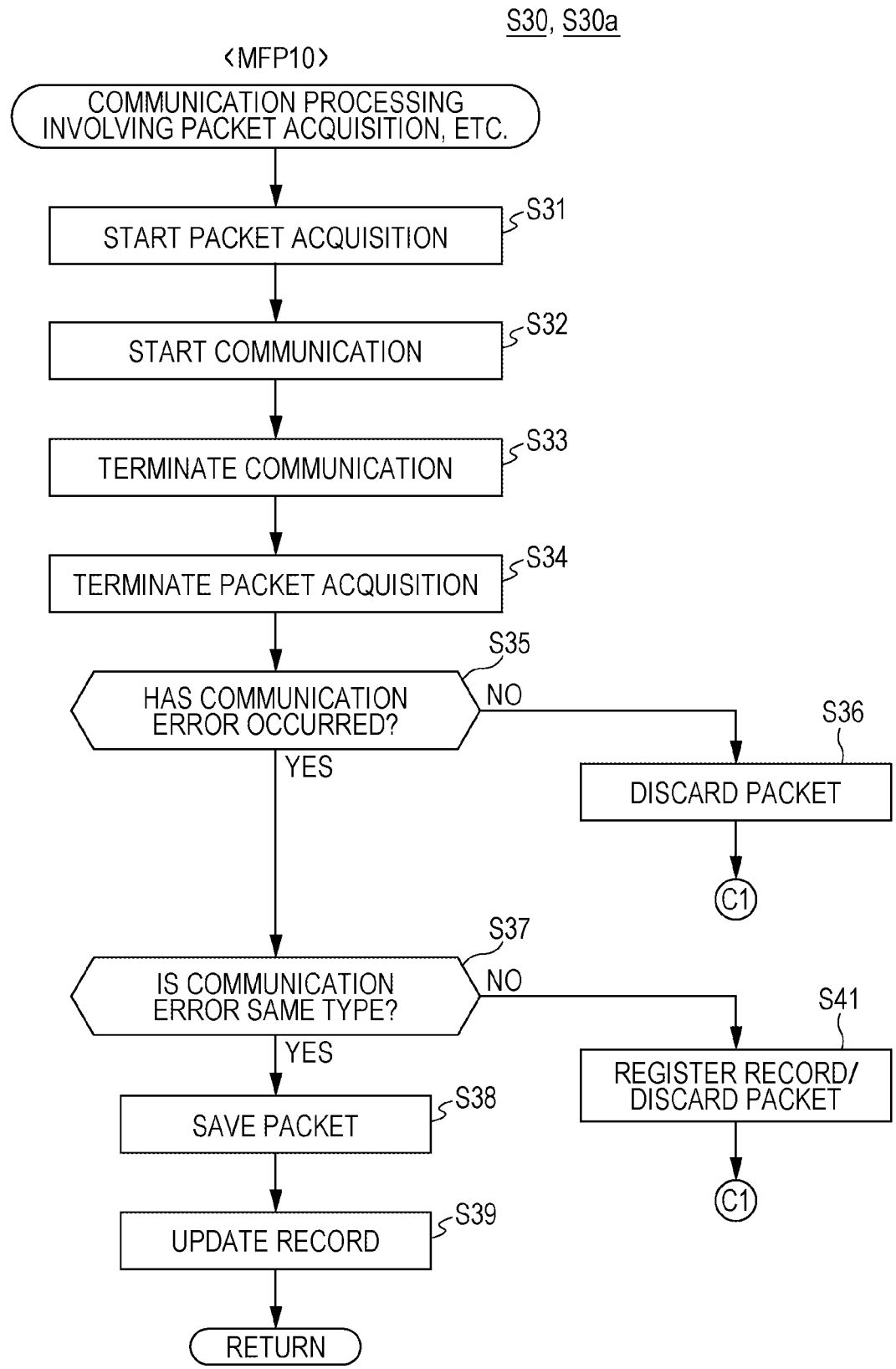
FIG. 4 is another flowchart illustrating the operation of the MFP according to the first embodiment.

FIGS. 3 and 4 are flowcharts illustrating operation of the MFP 10 according to the first embodiment. Hereinafter, the operation of the MFP 10 will be described with reference to those drawings and the like. Here, a case where network transmission of a scanned image (processing of generating a scanned image through scanning processing of a document and transmitting the generated scanned image to another device via a communication network) is performed as data communication will be exemplified.

In step S11, a user performs setting processing and the like. For example, processing of setting a transmission destination of a scanned image and the like are executed. The user executes updating operation (changing operation) to desired setting contents. Accordingly, a communication condition related to data transmission of the scanned image is updated. The updated communication condition E1 may include both of the preset setting contents (default setting contents) and the setting contents changed by the updating operation made by the user.

Thereafter, in step S12, the user presses a start button 41, and a network transmission instruction of the scanned image (also referred to as a generation start instruction of the scanned image (or scanning start instruction of the document)) is given. The instruction is also referred to as a scan job start instruction (including image generation processing and image transmission processing), or the like.

In response to the given network transmission instruction (prior to the network transmission of the scanned image), the MFP 10 executes the comparison processing of the communication condition and the like (steps S13 and S14).

Specifically, first, the MFP 10 compares the current communication condition E1 of the MFP 10 with the communication condition E2 (of the MFP 10) at the time of occurrence of each error in the past included in the error history information 210 (step S13). More specifically, coidentity of the communication conditions E1 and E2 with respect to at least one predetermined item (at least one item predetermined as an item for determining coidentity) is determined. Here, it is assumed that the "communication destination information" is employed (prespecified) as at least one predetermined item mentioned above, and the transmission destination set in step S11 and the like (transmission destination of the current communication destination setting (one external device of the external device group)) is sequentially compared with each transmission destination of a plurality of data records in the error history information 210.

However, in the comparison processing in step S13, among a plurality of data records in the error history information 210, only the data record in which the "status" column of the error history information 210 is "valid" is selected as a target of the comparison processing. The data record in which the "status" column of the error history information 210 is "saved" is excluded from the target of the comparison processing.

Thereafter, branching processing (step S14) according to the processing result of the comparison processing (step S13) is executed.

In a case where the current communication destination is different from the "communication destination (information)" of any data record in the error history information 210, the process proceeds to step S15 from step S14. In step S15, normal communication processing (network transmission (data transmission) of the scanned image) is executed without acquiring a packet.

Subsequently, when the network transmission is terminated (including both normal termination and abnormal termination (termination involving error occurrence)), it is determined whether an error has occurred (step S16). When an error (communication error) has occurred in the network transmission, information associated with the error is additionally recorded in the error history information 210 (step S17). On the other hand, when no error (communication error) has occurred in the network transmission, the error history information 210 is not changed. Note that the process returns to step S11 thereafter in either case.

Meanwhile, in a case where the current communication condition matches the "communication destination (information)" of any data record in the error history information 210 (in other words, both communication conditions E1 and E2 are determined to be the same), the process proceeds to step S30 from step S14.

In step S30 (see also FIG. 4), communication processing (network transmission of the scanned image) involving packet acquisition is executed (to be described next).

Specifically, first, in step S31 (FIG. 4), at the same time as acquisition of the communication packet group to be exchanged between the MFP 10 and the external device group (one or a plurality of devices outside the MFP 10) is started, communication processing related to the scanned image (network transmission of the scanned image) is started (step S32). In this manner, acquisition of the packet group is started before the data transmission (data transmission of the scanned image) is started (more specifically, immediately after the generation start instruction of the scanned image (immediately after pressing the start button 41)).

Thereafter, when the communication processing (data transmission of the scanned image) is terminated (step S33), the MFP 10 terminates the acquisition processing of the communication packet group (step S34). A plurality of communication packets related to the data transmission of the scanned image is included in the communication packet group acquired in the period between step S31 and step S34.

Further, in step S35, it is determined whether an error has occurred.

When it is determined that no error (communication error) has occurred in the network transmission (step S32 to S33), the process proceeds to step S36. In step S36, the MFP 10 discards (deletes) the communication packet group acquired from the start point of step S31 without recording it in the storage 5.

On the other hand, when it is determined that an error (communication error) has occurred in the network transmission, the process proceeds to step S37 from step S35. In step S37, it is determined whether the types of both errors of the error occurred in the current network communication (data communication) and the error occurred in the past data communication (one data communication in the past having the same communication condition) extracted in step S13 are the same.

When the types of both errors are different from each other, it is determined that an error of the type same as the type of the current error has not occurred yet (in other words, the type of error has occurred for the first time), and the process proceeds to step S41. Then, the error information of the error of the type that has occurred for the first time is recorded in the error history information 210 as a new data record (step S41). At this time, for example, "valid" is recorded in the "status" column of the new data record. In addition, in step S41, the communication packet group acquired in the network transmission (steps S31 to S34) is not recorded in the storage 5, and is discarded. The acquisition processing of the communication packet group is not executed on the current data communication, and is executed when the same type of error has occurred in the next and subsequent data communication in which the communication conditions related to at least a part of predetermined items are the same.

Meanwhile, when both errors have the same type, the process proceeds to step S38 from step S37. In step S38, the communication packet group acquired in the network transmission (steps S31 to S34) (current data communication) is stored (recorded) in a predetermined storage (in this case, a predetermined folder of the storage 5). Each communication packet group is stored as a file (in a state referable from the outside). More specifically, the communication packet group is recorded in a data file (data file for recording a communication packet) provided for each data communication, and the data file is stored in the storage 5.

Furthermore, the error history information 210 is also updated (step S39).

Specifically, in the "file name" column of the error history information 210, the file name (and storage destination device name) of the data file in which the communication packet group acquired in the current data communication is recorded is recorded. In other words, in the error history information 210, the file name (and storage destination device name) of the data file is recorded in association with past data communication having the communication condition (E2) same as the communication condition E1 with respect to at least one predetermined item.

Further, for example, "saved" is recorded in the "status" column of the error history information 210.

Subsequently, the process returns to step S11.

Thereafter, the operation as described above (see FIGS. 3 and 4) is executed each time data transmission is performed.

Note that, in step S13, among the plurality of data records in the error history information 210, only the data record in which the "status" column is "valid" is subject to the comparison processing, as described above. In other words, among the plurality of data records, the data record in which the "status" column is "saved" is excluded from the target of the comparison processing. Accordingly, it is possible to avoid storing the communication packet group having the same communication condition and at the same time of error occurrence again (in short, substantial duplicate saving). Even if the current data communication has the communication condition similar to the data record excluded from the target of the comparison processing (more specifically, communication condition same as the communication condition E2 with respect to at least one predetermined item), acquisition processing of the communication packet group related to the current data communication is not started, whereby very efficient acquisition processing of the communication packet group can be implemented.

<Exemplary Operation>

According to the operation as described above, (1) when data communication is performed under communication condition different from the past communication in which an error has occurred (error occurrence communication in the past), the acquisition processing and the storage processing of the communication packet group is not performed (step S15). More specifically, when contents of both of the communication conditions E1 and E2 with respect to at least one predetermined item are not determined to be the same, the acquisition processing and the storage processing of the communication packet group with respect to the current data communication is not performed. Therefore, unnecessary packet acquisition processing is not performed, whereby efficient acquisition processing of the communication packet group can be implemented. Moreover, unnecessary packet storage processing is also not performed, whereby packet storage capacity can be suppressed. Besides, when an error has occurred in the communication in this case, information associated with the error is stored in the error history information 210 in preparation for the next and subsequent communication (step S17).

For example, when the communication with the communication destination "192.168.10.150" is performed in the state where the error information of "No. 2" in FIG. 5 has not been recorded in the error history information 210 yet, it is determined that the condition is not satisfied in step S14, and the acquisition processing and the storage processing of the communication packet group is not performed (step S15). Further, when an communication error has occurred in this case, for example, the error information of "No. 2" in FIG. 5 is recorded in the error history information 210. At this time. "valid" is recorded in the "status" column of the data record related to the communication error.

On the other hand, (2) when the current communication is performed under the communication condition same as that in the past communication in which an error has occurred (more specifically, under the same communication condition with respect to at least one predetermined item) and no error has occurred in the current communication, (although the acquisition processing of the communication packet group related to the current data communication is performed (step S31)), the storage processing of the communication packet group is not performed (step S36). More specifically, when the contents of both of the communication conditions E1 and E2 with respect to at least one predetermined item are determined to be the same and no error has occurred in the current data communication, the storage processing of the communication packet group related to the current data communication is not performed (the communication packet group is discarded). Accordingly, the communication packet group related to the communication in which no error has occurred is not stored, whereby the packet storage capacity can be suppressed. Note that recording (writing processing) to the error history information 210 is also not performed in step S36.

For example, when the data communication with the communication destination "192.168.10.150" is performed in the state where the error information of "No. 2" in FIG. 5 is registered in the error history information 210, it is determined that the condition is satisfied in step S14, and the process proceeds to step S30. Thereafter, acquisition processing of the communication packet group related to the current data communication is performed (step S31). However, when no communication error has occurred in the data communication (No in step S35), the acquired packet is not stored in the storage 5 and is discarded (step S36).

Further, (3) when the current communication is performed under the condition same as that in the past communication (past error occurrence communication) in which an error has occurred (more specifically, under the same communication condition with respect to at least one predetermined item) and an error having an error type different from the error type of the past error occurrence communication has occurred in the current communication (for the first time), the information associated with the error is recorded in the error history information 210 in preparation for the next and subsequent communication (step S41). However, (although the acquisition processing of the communication packet group is executed (steps S31 and S34)), the storage processing of the communication packet group acquired through the acquisition processing is not performed, and the acquired communication packet group is discarded (step S41). In other words, when an error of the type same as the error type of the past error occurrence communication has not occurred (although the error itself has occurred) in the current data communication having the communication condition same as that in the past error occurrence communication (more specifically, same communication condition with respect to at least one predetermined item), the storage processing of the communication packet group acquired in the current data communication is not performed, and the communication packet group is discarded. Here, when the same type of error has occurred for the first time (occurred only once), the error may have occurred accidentally (may be solved in a short period of time), and analysis of the communication packet corresponding to the error may not be required. Therefore, the communication packet group related to the data communication in which the same type of error has occurred for the first time (data communication in which the same type of error has occurred only once) is not stored, whereby increase in the packet storage capacity can be efficiently suppressed.

For example, when new data communication (current data communication) with the communication destination "192.168.10.150" is performed in the state where the error information of "No. 2" in FIG. 5 is registered in the error history information 210, it is determined that the condition is satisfied in step S14, and the process proceeds to step S30. Then, in the data communication, when an error having an error type different from the error type "other communication error" of the past error occurrence communication (e.g., "authentication error") has occurred (for the first time), the error information is recorded in the error history information 210 in preparation for the next and subsequent communication (step S41). At this time, "valid" is recorded in the "status" column of the data record related to the error. In addition, the storage processing of the acquired communication packet group is not performed, and the communication packet group is discarded.

Meanwhile, (4) when the current communication is performed under the communication condition same as that in the past communication in which an error has occurred (past error occurrence communication) and an error of the type same as the past error occurrence communication has occurred in the current communication, the acquisition processing and the storage processing of the communication packet group is performed (steps S31 to S34 and S38). More specifically, when the contents of both of the communication conditions of E1 and E2 with respect to at least one predetermined item are determined to be the same and the same type of error (communication error having the error type same as the error type of the past error occurrence communication) has occurred in the current data communication, the acquisition processing and the storage processing of the communication packet group related to the current data communication is performed. Accordingly, it becomes possible to securely acquire the communication packet group related to the communication in which the same type of error has occurred for the second time (and the communication having the same or similar communication condition), and to store it in a predetermined storage. At this time, in the error history information 210, the data record of the past error occurrence communication having the communication condition E2 (data record corresponding to the communication error) is updated (step S39).

For example, when the data communication with the communication destination "192.168.10.150" is performed in the state where the error information of "No. 2" in FIG. 5 is registered in the error history information 210, it is determined that the condition is satisfied in step S14, and the process proceeds to step S30. Then, when a communication error has occurred in the current data communication and the communication error is the "other communication error" (when it is determined that the communication error of the type same as that of the error information of "No. 2" has occurred), the communication packet group acquired insteps S31 to S34 is stored in the storage 5 (step S38). More specifically, a file (data file) including the communication packet group at the time of the data communication is generated and stored in the storage 5, Further, the communication error information is recorded in the error history information 210 (step S39). In particular, in the "file name" column of the data record corresponding to the communication error, the file name and the like of the data file including the communication packet group at the time of the data communication is recorded. Furthermore, "saved" is recorded in the "status" column of the data record corresponding to the communication error. By using the information in the "status" column, substantial duplicate saving can be excluded as described above.

<1-4. Effect of First Embodiment>

In the operation descried above, the communication condition E1 at the time of the current data communication (new data communication) and the communication condition E2 at the time of occurrence of one error in the past included in the error history information 210 are compared with each other (step S13). Then, the acquisition processing of the communication packet group related to the current data communication (more specifically, communication packet group related to the communication including the current data communication) is started on condition that the contents of both of the conditions E1 and E2 with respect to at least one predetermined item are the same (step S31). In other words, the acquisition processing of the communication packet group is not executed for all of a plurality of data transmissions, but the acquisition processing of the communication packet group is executed for only a part of the data transmissions.

Here, when the communication conditions with respect to at least one predetermined item are determined to be the same (in short, when the communication condition is similar to that in the past error occurrence), there is a possibility that an error of the cause same as that of the past error (in particular, reproducible error) occurs to a certain extent.

Therefore, the acquisition processing of the communication packet group is executed on, among a plurality of times of data communication, only a part of the data transmissions in which the communication condition with respect to at least one predetermined item is determined to be the same as the communication condition E2 (steps S13, S14, and S31), whereby the communication packet group related to abnormality occurrence communication (in particular, data communication in which an error of the cause same as that in the past has occurred) can be efficiently acquired. More specifically, the communication packet group can be efficiently acquired compared with a case where the acquisition operation of the communication packet group is constantly (uniformly) executed on all data communication. In other words, acquisition processing of a communication packet is executed only in the case where, among the plurality of times of data communication, the data communication having a specific communication condition (more specifically, communication condition in which a value (content) of at least one predetermined item matches) is executed, whereby the efficient acquisition processing of the communication packet group can be implemented. As a result, a load on the MFP 10 can be suppressed.

In particular, in step S13, it is determined whether the (past) communication packet group related to the (past) "same condition abnormal communication" has already been (acquired and) stored on the basis of the storage result information ("saved", etc.) included in the error history information 210 (see also FIG. 5). Then, acquisition of the communication packet group related to new data communication is started (step S31) on condition that the communication packet group related to the "same condition abnormal communication" (another past data communication having the communication condition same as the second communication condition E2 with respect to at least one predetermined item in which an error has occurred) has not been stored yet (data file including the communication packet group has not been stored yet) (steps S13 and S14). Therefore, even when the data communication (more specifically, abnormal data communication) having a specific communication condition (more specifically, communication condition in which a value of at least one predetermined item matches) is performed a plurality of times, only the communication packet group related to one data communication among them is acquired, whereby very efficient acquisition processing of the communication packet group can be implemented.

Furthermore, after steps S14 and S31, the communication packet group acquired in the current data communication is stored in a predetermined storage (step S38) on condition that an error of the type same as the error type of one past error has occurred in the current data communication (steps S35 and S37). Therefore, compared with the technique in which the communication packet group in the current data communication is completely stored regardless of whether an error has occurred (or regardless of the error type), the storage capacity of the communication packet can be suppressed.

<1-5. Determination Condition in Step S14>

In step S14 as described above, it is determined whether, among the two communication conditions of the communication condition E1 of the current data communication and the communication condition E2 of the past data communication, contents with respect to at least one predetermined item are the same.

Examples of the at least one predetermined item include, as described above. "transmission destination information (IP address of a transmission destination device, etc.)". That is, it only needs to determine the coidentity of the communication conditions E1 and E2 on the basis of the coidentity of the contents of the item "transmission destination information (IP address of the transmission destination device, etc.)". However, the present invention is not limited thereto.

For example, the coidentity of the communication conditions E1 and E2 may be determined on the basis of the coidentity of the contents (setting contents) of the item "protocol".

Alternatively, the coidentity of the communication conditions E1 and E2 may be determined on the basis of the coidentity of the contents of both of those two items "transmission destination information" and "protocol". Specifically, both of the communication conditions E1 and E2 may be determined to be the same when the contents of the item "transmission destination information" in the communication condition E1 and the contents of the item "transmission destination information" in the communication condition E2 are the same and the contents of the item "protocol" in the communication condition E1 and the contents of the item "protocol" in the communication condition E2 are the same.

Further, the coidentity of the communication conditions E1 and E2 may be determined on the basis of contents of items other than those illustrated in FIG. 5.

For example, the coidentity of the communication conditions E1 and E2 may be determined on the basis of contents of an item "port number" (port number in software). Accordingly, the communication packet group (communication packet group at the time of error occurrence) can be saved for each "port number". Therefore, in a case where, for example, an error repeatedly occurs in the same port number setting (due to incorrect setting of the port number, etc.), communication data for which the port number is set (communication packet group at the time of error occurrence) can be efficiently acquired (saved).

Alternatively, the coidentity of the communication conditions E1 and E2 may be determined on the basis of the setting contents of the protocol and the setting contents of each item "user name" and "password" used for authentication of the protocol. By considering the coidentity of the setting contents of the "user name", the communication packet group (communication packet group at the time of error occurrence) can be acquired for each "user name". Therefore, in a case where, for example, an error repeatedly occurs in the state where the same user name is set (due to incorrect input of tire user name, etc.), communication data for which the user name is set (communication packet group at the time of error occurrence) can be efficiently acquired (saved). The same applies to the "password".

Alternatively, the coidentity of the communication conditions E1 and E2 may be determined on the basis of the setting contents of the protocol and the setting contents of an "authentication method used in the protocol (authentication method for each protocol)".

More specifically, the coidentity of the communication conditions E1 and E2 may be determined also on the basis of the setting contents concerning whether the authentication method of the SMTP protocol is "digest (MD5) authentication" or "basic authentication" (also referred to as "plain"). Note that, while a password or the like is transmitted/received in a concealed (hashed, etc.) state using each authentication method in the "digest (MD5) authentication", a password or the like is transmitted/received without being concealed in the "basic authentication" ("plain").

Further, the coidentity of the communication conditions E1 and E2 may be determined on the basis of the setting contents concerning whether the authentication method of the WebDAV protocol is "Windows NT LAN manager (NTLM) authentication", "digest (MD5) authentication", or "basic authentication" (also referred to as "plain").

Furthermore, the coidentity of the communication conditions E1 and E2 may be determined also on the basis of version information of each authentication method. For example, the coidentity of the communication conditions E1 and E2 may be determined on the basis of version information of the authentication method "NTLM, authentication" of the SMB protocol.

By determining the coidentity of the communication conditions E1 and E2 also on the basis of the setting contents of the "authentication method used in each protocol (authentication method for each protocol)", the communication packet group (communication packet group at the time of error occurrence) can be acquired for each authentication method. Therefore, in a case where, for example, an error repeatedly occurs in the state where the same authentication method is set (due to incorrect setting of the authentication method, etc.), communication data for which the authentication method is set (communication packet group at the time of error occurrence) can be efficiently acquired (saved).

In this manner, the coidentity may be determined for all items of a certain upper level item (communication protocol) and lower level items lower than the upper level item (authentication method, user name. password, etc.). In other words, the coidentity with respect to a plurality of hierarchized items may be determined.

Alternatively, the coidentity of the communication conditions E1 and E2 may be determined on the basis of contents (setting contents) of a file format (portable document format (PDF), joint photographic experts group (JPEG) format, etc.) of image data transmitted/received to/from the communication destination (communication partner). For example, in a case where a setting is made not to accept a specific file format in a communication destination device (e.g., mail server), a communication error may occur due to the file format. In such a situation, by considering the coidentity of the file format of the image data, the communication packet group (communication packet group at the time of error occurrence) can be acquired for each file format. Therefore, in a case where, for example, an error repeatedly occurs in the communication related to an image in a specific file format, communication data in which the image in the specific file format is transmitted (or received) (communication packet group at the time of error occurrence) can be efficiently acquired (saved).

Further, the coidentity with respect to both the upper level item ("transmission destination information" (communication destination device)) and the lower level item (file format) lower than the upper level item may be determined.

Furthermore, both of the communication conditions E1 and E2 may be determined to be the same on condition that the contents (item values) of a plurality of predetermined items (a plurality of preset items) including all of (or a part of) the items described above are the same.

<2. Second Embodiment>

A second embodiment is a variation of the first embodiment. Hereinafter, differences from the first embodiment will be mainly described.

In the first embodiment, a mode in which the present invention is applied to data transmission processing (more specifically, transmission processing of a scanned image (image data)) has been described.

In the second embodiment, a mode in which the present invention is applied to data reception processing (more specifically, reception processing of print data (print job data)) will be described.

Figure 6:
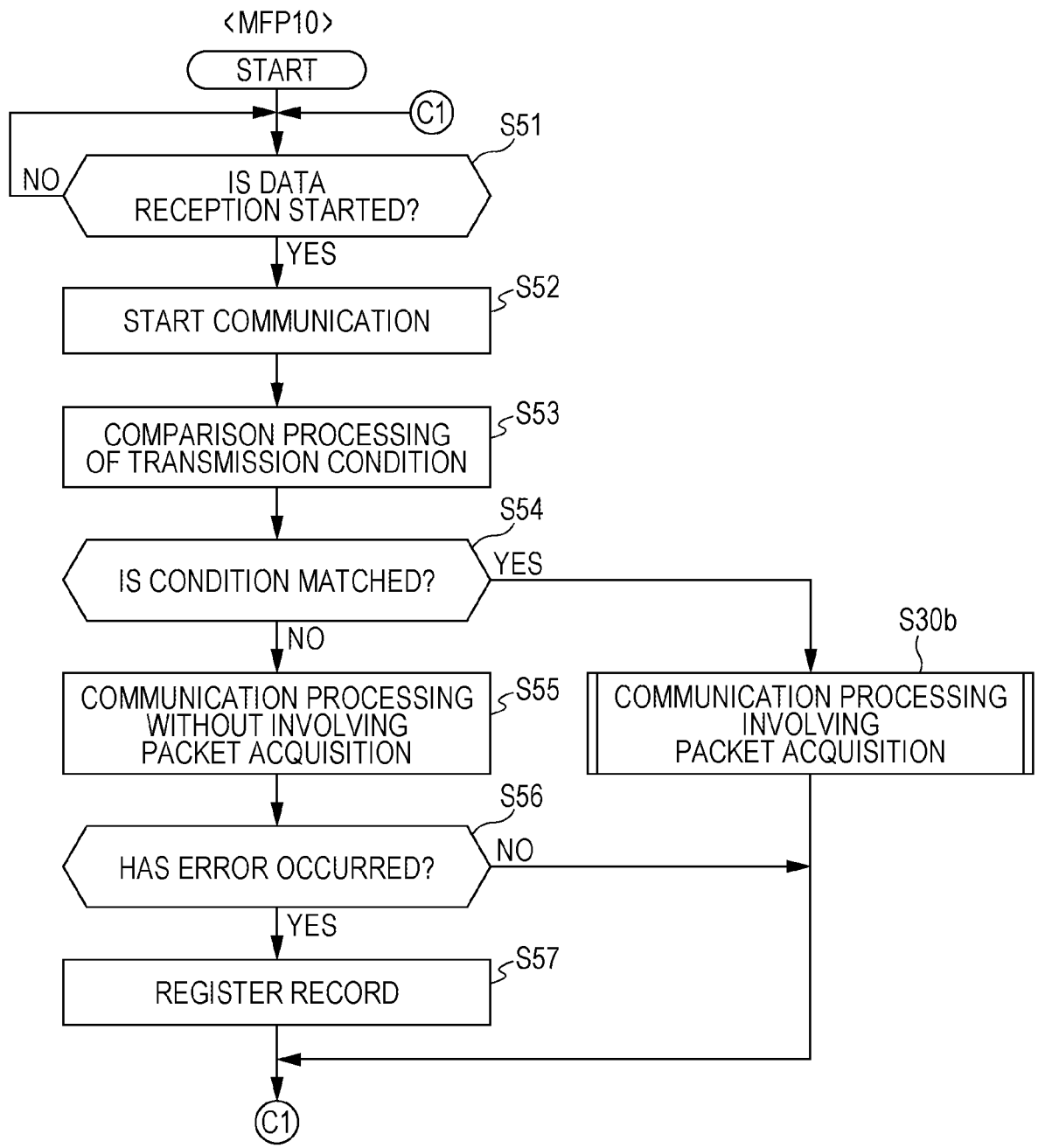
FIG. 6 is a flowchart illustrating operation of an MFP according to a second embodiment.
Figure 7:
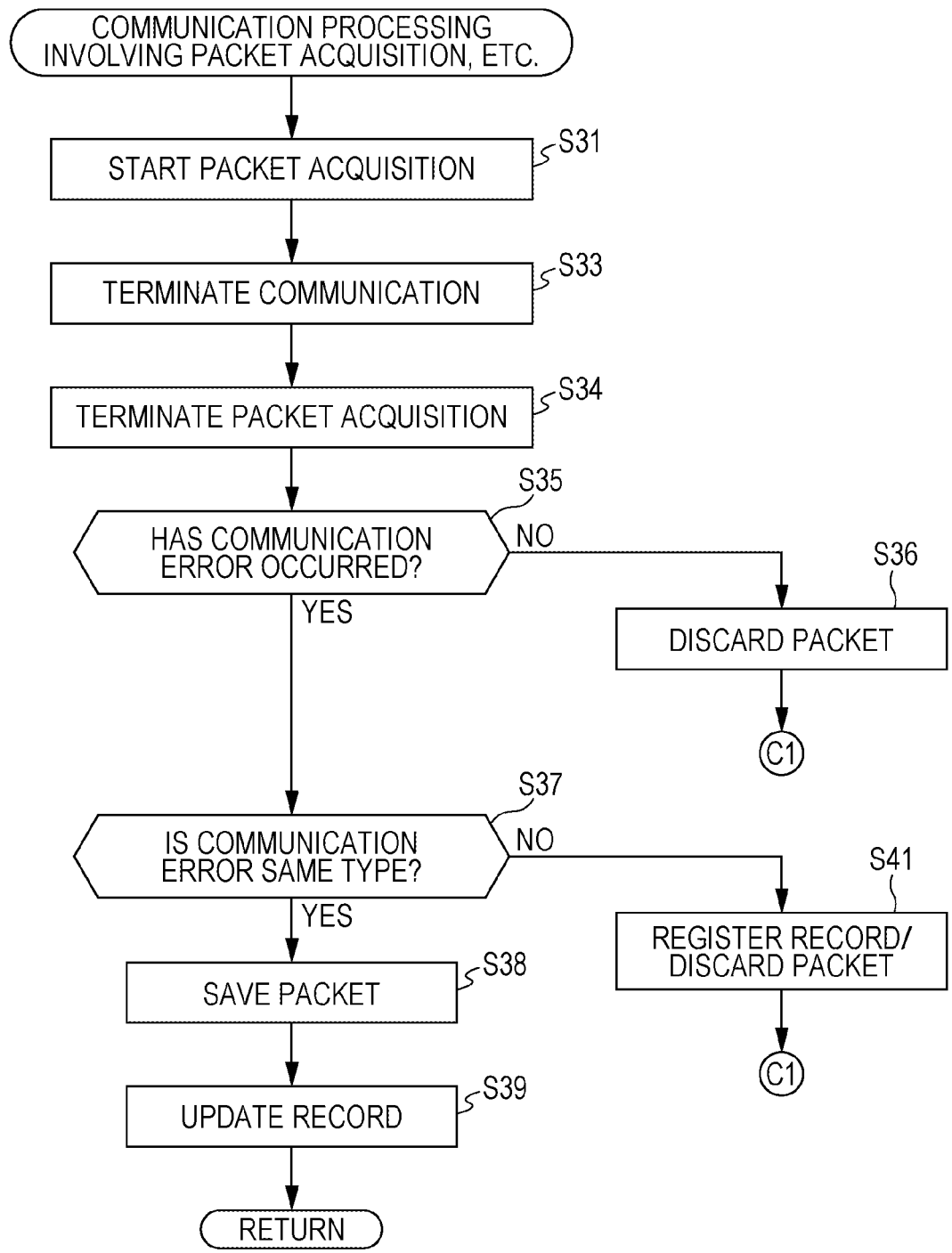
FIG. 7 is another flowchart illustrating the operation of the MFP according to the second embodiment.

FIGS. 6 and 7 are flowcharts illustrating operation of an MFP 10 according to the second embodiment. As will be understood by being compared with FIGS. 3 and 4, the operation in the second embodiment is different from the operation in the first embodiment in the following points. Specifically, in the first embodiment, it is determined whether packet acquisition is started (step S14) before data communication is started (steps S15 and S32). On the other hand, in the second embodiment, it is determined whether packet acquisition is started (step S54) after data communication is started (step S52).

In the second embodiment, communication processing (data reception processing) is started at the time when a first communication packet from another device is received in a standby loop (reception data standby loop) in step S51 (step S52). In steps S53 to S57, processing similar to that in steps S13 to S17 is executed. In addition, in step S30 (also referred to as S30b) (FIG. 7), it is different from step S30 (also referred to as S30a) in FIG. 4 in that step S32 ("start communication") does not exist.

In the second embodiment, although packet acquisition is started in step S31 (FIG. 7) when the condition is determined to be satisfied in step S54 (FIG. 6), data reception processing (step S52) is started before steps S54 and S31. Therefore, in the packet acquisition processing, some communication packets (first several communication packets) received in a minute period before the time point of starting the packet acquisition (step S31) are missing. However, communication packets after the first several communication packets (in particular, communication packet group before and after the error occurrence time point, etc.) can be received (in step S31 and subsequent steps). In other words, it is highly likely that the acquisition processing of the communication packet group is started by the time point at which an error actually occurs. The communication packet group received in such a manner is acquired (saved) in a similar manner to the first embodiment described above, whereby the communication packet group for packet analysis processing can be acquired (saved).

FIG. 8 is a diagram illustrating exemplary error history information 210 (212) according to the second embodiment. As will be understood by being compared with the error history information 210 (also referred to as 211) in FIG. 5, a protocol (LPD. IPP. etc.) unique to transmission/reception of print data can also be included in the "protocol" column in the error history information 212.

Hereinafter, a mode in which coidentity with respect to "protocol" (or port number) is determined as a determination condition in step S54 will be mainly described. In other words, a mode in which the "(communication) protocol" is employed (predesignated) at least as a predetermined item will be mainly described.

Specifically, (1) when communication is performed under a communication condition different from the communication in which an error has occurred in the past (when the condition is determined to be unsatisfied in step S54), acquisition processing and storage processing of the communication packet group is not performed (step S55). More specifically, when contents of both of the communication conditions E1 and E2 with respect to at least one predetermined item are not determined to be the same, the acquisition processing and the storage processing of the communication packet group with respect to the current data communication is not performed. Therefore, unnecessary packet acquisition processing is not performed, whereby efficient acquisition processing of the communication packet group can be implemented. Moreover, unnecessary packet storage processing is not performed, whereby packet storage capacity can be suppressed. Besides, when an error has occurred in the communication in this case, information associated with the error is stored in the error history information 212 in preparation for the next and subsequent communication (step S57).

For example, when data reception is started at a port No. 445 (step S52) in the state where error information of "No. 1" in FIG. 8 has not been recorded in the error history information 212 yet, it is determined to be data reception according to an SMB protocol. Here, it is assumed that data according to each protocol is received at a predetermined port (standby port of each protocol is fixed). Specifically, it is assumed that data according to the SMB protocol is started to be received at the port "445", and data according to an FTP protocol is started to be received at the port "21".

When it is determined that the data reception according to the SMB protocol is started in the state where the error information of "No. 1" in FIG. 8 has not been recorded in the error history information 212 yet, it is determined that the condition is not satisfied in step S54, and the acquisition processing and the storage processing of the communication packet group is not performed (step S55). Further, when an communication error has occurred in this case, for example, the error information of "No. 1" in FIG. 8 is recorded in the error history information 212 (steps S56 and S57). At this time, "valid" is recorded in the "status" column of the data record related to the communication error.

On the other hand, (2) when the current communication is performed under the communication condition same as that in the past communication in which an error has occurred (past error occurrence communication) (more specifically, under the same communication condition with respect to at least one predetermined item) and no error has occurred in the current communication, storage processing of the communication packet group is not performed (communication packet group is discarded), and writing processing to the error history information 212 is also not performed (step S56). Accordingly, the communication packet group related to the communication in which no error has occurred is not stored, whereby the packet storage capacity can be suppressed.

For example, when data reception is started at the port No. 445 (step S52) in the state where the error information of "No. 1" in FIG. 8 has been recorded in the error history information 212, it is determined to be the data reception according to the SMB protocol, determined that the condition is satisfied in step S54, and the process proceeds to step S30b. Thereafter, the acquisition processing of the communication packet group related to the current data communication is performed (step S31). However, when no communication error has occurred in the data communication (No in step S35), the acquired packet is not stored in the storage 5 and is discarded (step S36).

Further, (3) when the current communication is performed under the communication condition same as that in the past communication (past error occurrence communication) in which an error has occurred (more specifically, under the same communication condition with respect to at least one predetermined item) and an error having an error type different from the error type of the past error occurrence communication has occurred in the current communication, the information associated with the error is recorded in the error history information 212 in preparation for the next and subsequent communication (step S41). However, (although the acquisition processing of the communication packet group is executed (steps S31 and S34)), the storage processing of the communication packet group acquired through the acquisition processing is not performed, and the communication packet group is discarded (step S41). Here, when the same type of error has occurred for the first time (occurred only once), the error may have occurred accidentally (may be solved in a short period of time), and analysis of the communication packet corresponding to the error may not be required. Therefore, the communication packet group related to the data communication in which the same type of error has occurred for the first time (data communication in which the same type of error has occurred only once) is not stored, whereby increase in the packet storage capacity can be efficiently suppressed.

For example, when data reception is started at the port No. 445 (step S52) in the state where the error information of "No. 1" in FIG. 8 has been recorded in the error history information 212, it is determined to be the data reception according to an SMB protocol. In this case, the condition is determined to be satisfied in step S54, and the process proceeds to step S30b. Then, when an error having an error type different from the error type "connection error" of the past error occurrence communication (e.g., "authentication error") has occurred (for the first time), the error information is recorded in the error history information 210 in preparation for the next and subsequent communication (step S41). At this time, "valid" is recorded in the "status" column of the data record related to the communication error. In addition, the storage processing of the acquired communication packet group is not performed, and the communication packet group is discarded.

Meanwhile, (4) when the current communication is performed under the communication condition same as that in the past communication in which an error has occurred (past error occurrence communication) and an error of the type same as the past error occurrence communication has occurred in the current communication, the acquisition processing and the storage processing of the communication packet group is performed (steps S31, S33, S34, and S38). More specifically, when the contents of both of the communication conditions of E1 and E2 with respect to at least one predetermined item are determined to be the same and the same type of error (error having the error type same as the error type of the past error occurrence communication) has occurred in the current data communication, the acquisition processing and the storage processing of the communication packet group related to the current data communication is performed. Accordingly, it becomes possible to securely acquire the communication packet group related to the communication in which the same type of error has occurred twice or more (and the communication having the same or similar communication condition), and to store it in a predetermined storage.

For example, when data reception is started at the port No. 445 (step S52) in the state where the error information of "No. 1" in FIG. 8 has been recorded in the error history information 212, it is determined to be the data reception according to an SMB protocol. In this case, the condition is determined to be satisfied in step S54, and the process proceeds to step S30b. Then, when a communication error has occurred in the current data communication and the communication error is the "connection error" (when it is determined that the communication error of the type same as that of the error information of "No. 1" has occurred), the communication packet group acquired during the period from the time point at which the packet acquisition is started (step S31) to the time point at which the packet acquisition is terminated (S34) is stored in the storage 5 (step S38). More specifically, a file (data file) including the communication packet group at the time of the data communication is generated and stored in the storage 5. Further, the communication error information is recorded in the error history information 212 (step S39). In particular, in the "file name" column of the data record related to the communication error, the file name and the like of the data file including the communication packet group at the time of the data communication is recorded. Furthermore, "saved" is recorded in the "status" column of the data record related to the communication error. By using the information in the "status" column, substantial duplicate saving can be excluded as described above.

Note that, in step S54, in a similar manner to step S14, the coidentity of the communication conditions E1 and E2 may be determined on the basis of the coidentity with respect to various predetermined items (communication destination information, authentication method, etc.). Moreover, the determination processing in step S54 (processing of determining the coidentity of the contents with respect to at least one predetermined item in both of the communication conditions E1 and E2) may be executed after (preferably, immediately after) the time point at which the "communication condition (content) with respect to at least one predetermined item" to be a target of the coidentity determination in step S54 is determined. For example, when the coidentity of the communication conditions E1 and E2 is determined on the basis of contents of an item (not illustrated) in the error history information 210, the determination processing in step S54 may be executed at the time point at which, after the data reception is started, communication according to each protocol is started, information exchange with respect to an authentication method between two devices is performed, and agreement on the authentication method is settled (authentication method to be adopted (agreement content) is determined).

The operation as described above may be performed. As a result, effects similar to those in the first embodiment can be exerted.

<3. Variations Etc.>

Although the embodiments of the present invention have been described above, the present invention is not limited to the contents described above.

<Number of Savings>

For example, although acquisition of a communication packet group related to a current data communication is started (step S13 (S53), S14 (S54), and S31) on condition that another communication packet group related to (past) same condition abnormal communication has not been stored yet in each of the above-described embodiments, it is not limited thereto. For example, acquisition of the communication packet group related to new data communication may be started (step S31) on condition that the number of storage (number of savings) of another communication packet group related to at least one same condition abnormal communication is less than a predetermined number of times (steps S13, S14, etc.).

More specifically, for example, "(number of savings) N" may be recorded in the "status" column in error history information 210 instead of "saved". In other words, the error history information 210 may include storage result information indicating the number of times of acquisition and storage (savings) of (another) communication packet group related to the same condition abnormal communication. Then, the number of times of the storage (number of times of savings) of the communication packet group related to at least one same condition abnormal communication may be determined on the basis of the storage result information (saving times information) included in the error history information 210. More specifically, in comparison processing in step S13, among a plurality of data records in the error history information 210, only the data record in which a value N of the "status" column of the error history information 210 is less than a predetermined value TH1 (e.g., five times) may be selected as a target of the comparison processing. Note that the information in the "status" column in the error history information 210 may also be referred to as information for controlling whether the acquisition processing of the communication packet group is to be executed.

According to such operation, the number of times of the acquisition of the communication packet group in abnormal communication having the communication condition same as the communication condition E2 (same communication condition with respect to at least one predetermined item) is limited to the predetermined number of times, whereby efficient acquisition operation of the communication packet group can be implemented. Moreover, since only the communication packet group on which such acquisition operation has been performed can be the storage target, the communication packet group to be the storage target is narrowed, whereby packet storage capacity can be suppressed.

Note that, although the storage result information is included in one data table representing the error history information 210 in each of the above-described embodiments and the like, it is not limited thereto, and the storage result information may be stored separately from the one data table (e.g., as another file).

<Sharing of Error History Information in Multiple MFPs (Client Server System)>

Although the error history information 210 acquired by a certain MFP 10 is used only by the certain MFP 10 in each of the above-described embodiments, it is not limited thereto.

For example, in a communication system 1 (1B) (client server system) including a server 70 and a plurality of MFPs 10 (10a, 10b, 10c, etc.) (see FIG. 9), the common error history information 210 (215) may be stored in the server 70, and the error history information 215 (also referred to as common error history information) may be shared by the plurality of MFPs 10. That is, each MFP 10 may use the error history information 210 (215) common to the plurality of MFPs 10. In other words, each MFP 10 may access the common error history information 215 provided in the server 70 to acquire error history information for each MFP 10. Note that illustration of a computer 50 and the like is omitted in FIG. 9.

Specifically, when an error is detected in any MFP 10 (e.g., 10a), the MFP 10 (10a) in which the error has been detected may transmit information associated with the error (error information) to the server 70, and the error information may be recorded in the error history information 215 in the server 70.

Thereafter, each MFP 10 (10a, 10b, 10c, etc.) may refer to the error history information 215 in the server 70 and may execute operation similar to that in each of the above-described embodiments.

Then, when any MFP 10 (e.g., 10b) among the plurality of MFPs 10 acquires the communication packet group of the error communication under a certain communication condition, the MFP 10 (10b) may transmit a data file including the communication packet group to the server 70, and the data file (in other words, the communication packet group) may be stored in a storage in the server 70. However, it is not limited thereto, and the communication packet group may be stored in a storage of a device other than the server 70 (e.g., predetermined storage in the MFP 10b).

According to such operation, after an error has occurred in the data communication in one MFP 10 (e.g., 10a) among the plurality of MFPs 10, a communication packet group related to data communication having a communication condition similar to the data communication is acquired in cooperation with the plurality of MFPs 10 (10a, 10b, 10c, etc.) including other MFPs 10 (10b, 10c, etc.). Therefore, the communication packet group related to the error communication can be efficiently acquired in cooperation with the plurality of MFPs 10. In other words, a cause of the errors possibly occurs in a similar manner in the plurality of MFPs 10 can be collaboratively determined by the plurality of MFPs 10.

Furthermore, after any MFP 10 acquires the communication packet group of the error communication under a certain communication condition and the communication packet group is stored in a predetermined storage (storage in the server 70, etc.), the "status" column of the corresponding data record in the error history information 210 (215) (see FIG. 5) may be changed to: "saved" so that no further acquisition processing of the communication packet group is executed by other MFPs 10. In other words, the communication packet group of the abnormal data communication having the same communication condition may be acquired by only one optional MFP 10 among the plurality of MFPs 10. Accordingly, no further acquisition processing is executed by other MFPs 10 other than the one MFP 10, whereby the efficient acquisition processing and storage processing of the communication packet group can be implemented.

Note that it is not limited thereto, and the "number of savings N" may be recorded in the "status" column of the corresponding data record in the error history information 210. Then, when the storage processing (saving processing) of the communication packet group is executed by the entire multiple MFPs 10 for predetermined value TH2 times (e.g., five times), thereafter, no further acquisition processing of the communication packet group performed by any MFP 10 may be executed. Accordingly, when the storage processing of the communication packet group of the abnormal data communication having the same communication condition is performed by the entire multiple MFPs 10 for TH2 times, no further acquisition processing is performed in any MPF thereafter, whereby the efficient acquisition processing and storage processing of the communication packet group can be implemented. For example, while the packet storage processing is performed 50 times (=5×10) in total in a case where ten MFPs 10 individually (respectively) perform the packet group storage processing five times, according to such a mode, it is sufficient to perform the packet storage processing only five times in total using ten MFPs 10 as a whole.

<Sharing of Error History Information in Multiple MFPs (Serverless System)>

Figure 10:
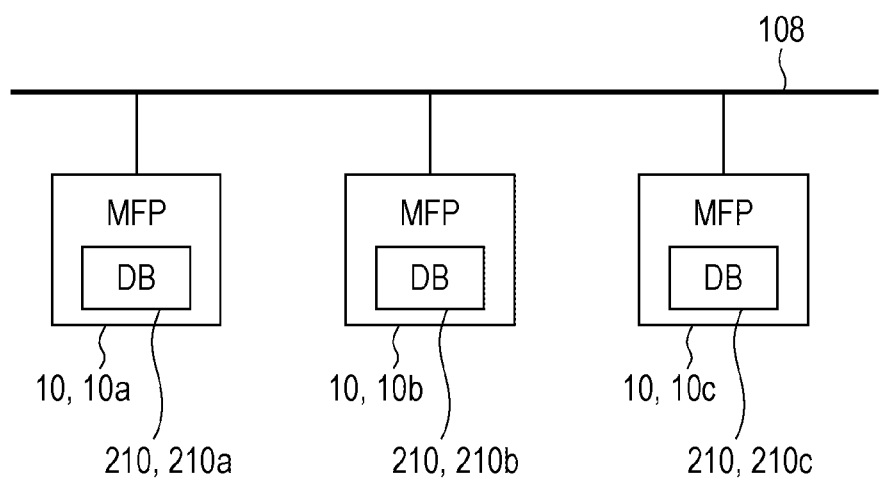
FIG. 10 is a diagram illustrating a communication system according to another variation.

Alternatively, in a serverless system including a communication system 1 (IC) including no server, specifically, a plurality of MFPs 10 (10a, 10b, 10c, etc.) (see FIG. 10), the error history information 210 (210a, 210b, 210c, etc.) stored in each of the plurality of MFPs 10 may be synchronized with one another. In other words, the error history information 210 substantially made identical by such synchronous operation (common error history information 210) may be used. Note that illustration of the computer 50 and the like is omitted in FIG. 10.

Specifically, first, each MFP 10 grasps the plurality of MFPs 10 (10a, 10b, 10c, etc.) existing in the same LAN using multicast or the like, and determines that the plurality of MFPs 10 is the same group of devices.

Thereafter, when an error is detected in any MFP 10 (e.g., 10a), the MFP 10 (10a) in which the error has been detected records the error information in the error history information 210 (210a) of its own device (10a), and transmits the error information to other MFPs 10 (10b, 10c, etc.) to cause each error history information 210 (210b, 210c, etc.) in the other MFPs 10 to store the error information. In other words, each MFP 10 also causes the error history information in each of other devices to be updated at the time when the error history information 210 in its own device is updated, thereby setting up the error history information common to the plurality of MFPs 10 (common error history information).

Then, each MFP 10 (10a, 10b, 10c, etc.) may refer to the error history information 210 in its own device (210a, 210b, 210c, etc.) (also referred to as common error history information) and may execute the operation similar to that in each of the above-described embodiments.

Figure 9:
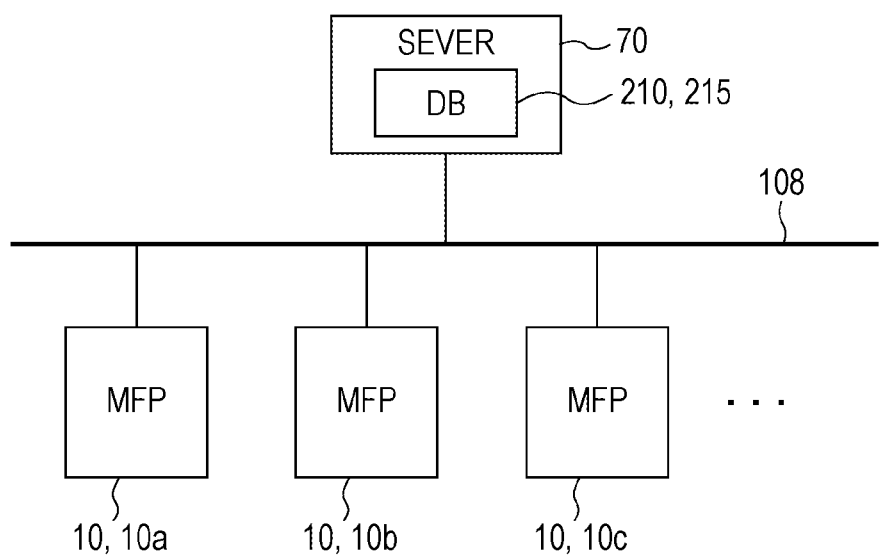
FIG. 9 is a diagram illustrating a communication system according to a variation.

According to such operation, in a similar manner to the mode illustrated in FIG. 9, after an error has occurred in the data communication in one MFP 10 (e.g., 10a) among the plurality of MFPs 10, a communication packet group related to data communication having a communication condition similar to the data communication is acquired in cooperation with the plurality of MFPs 10 (10a, 10b, 10c, etc.) including other MFPs 10 (10b, 10c, etc.).

Therefore, the communication packet group related to the error communication can be efficiently acquired in cooperation with the plurality of MFPs 10. In other words, a cause of the errors possibly occurs in a similar manner in the plurality of MFPs 10 can be collaboratively determined by the plurality of MFPs 10.

Furthermore, after any MFP 10 acquires the communication packet group of the error communication under a certain communication condition and the communication packet group is stored in a predetermined storage (storage 5 in any MFP 10. etc.). the "status" column of the corresponding data record in each error history information 210 (210a, 210b, 210c, etc.) (see FIG. 5) may be changed to "saved" so that no further acquisition processing of the communication packet group is executed by each MFP 10. Accordingly, it is sufficient to acquire the communication packet group of the abnormal data communication having the same communication condition using one MFP 10 among the plurality of MFPs 10.

Note that it is not limited thereto, and the "(number of savings) N" may be recorded in the "status" column of the corresponding data record in each error history information 210 (210a, 210b, 210c, etc.). Then, when the storage processing (saving processing) of the communication packet group is executed by the entire multiple MFPs 10 for a value TH3 times (e.g., five times), thereafter, no further acquisition processing of the communication packet group performed by any MFP 10 may be executed. Accordingly, when the storage processing of the communication packet group of the abnormal data communication having the same communication condition is performed by the entire multiple MFPs 10 for TH3 times, no further acquisition processing is performed in any MPF thereafter, whereby the efficient acquisition processing and storage processing of the communication packet group can be implemented.

<Packet Acquisition Permission>

In each of the above-described embodiments, acquisition processing of the communication packet group related to the current data communication and the storage processing of the communication packet group may be started on condition that acquisition permission of the communication packet is given to the MFP 10. The acquisition permission of the communication packet only needs to be given to the MFP 10 by an administrator or a user. For example, in the state where an operation screen (approval screen) for giving the acquisition permission of the communication packet is displayed, the administrator or the like may perform operation for permitting the packet acquisition using the MFP 10 (permission giving operation) according to guidance in the operation screen. Such permission giving operation may be executed in advance before the operation in FIG. 3, for example, or may be executed at the time point at which the first error of the data communication having a certain communication condition has occurred (step S17 or step S41).

<Software Operation Log>

Moreover, in each of the above-described embodiments; when the communication packet group is stored in step S39 (FIG. 4) or the like, data in which a relationship between a communication timing of each communication packet included in the communication packet group and a progress stage of a predetermined application software (communication application software, etc.) in the MFP 10 is recorded may be stored.

More specifically, the number indicating each execution stage (i-th stage) of the application software (e.g., number corresponding to a row number of a program (sequence code, etc.)) only needs to be recorded in a data file for recording the communication packet as needed according to the progress of the application software. More specifically, the number indicating each of the execution stages (i-th stage) and the communication packet exchanged in each of the execution stages (also referred to as progress stages) only need to be associated with each other and recorded in the data file for recording the communication packet. In this manner, an analyzer (serviceman of the MFP 10, etc.) of the communication packet group can easily understand in which execution stage (progress stage) of the application software each communication packet is generated.

<Job Information Log>

Moreover, in each of the above-described embodiments, when the communication packet group related to the current data communication is stored in step S39 or the like, information associated with an execution job of the current data communication may be stored in association with the communication packet group. For example, in the error history information 210, the information associated with the execution job of the current data communication (e.g., job type, job ID, etc.) may also be recorded in association with the data record of the data communication having the communication condition same as that in the current data communication with respect to at least one predetermined item. Alternatively, the information associated with the execution job of the current data communication may be stored in association with the communication packet group in another data table or the like different from the data table representing the error history information 210.

By recording the "job type", it is possible to easily determine execution of which type of job (print job, scan job, etc.) among a plurality of job types the error that has occurred in the current data communication is related to. In addition, by recording the "job ID (job identifier)", it is possible to easily determine execution of which job (identified by a job ID) among a plurality of jobs the error is related to.

<Cancellation (Interruption) of Communication Packet Acquisition Processing>

Moreover, in each of the above-described embodiments and the like, although the acquisition processing of the communication packet group (step S31) started in the current data communication in response to confirmation of the coidentity of the communication condition is continued until the data communication is terminated (step S33) regardless of success/failure of the current data communication, it is not limited thereto.

When it is determined that, after the acquisition processing of the communication packet group is started in the current data communication, a cause of an error of the type same as the error type of one error in the past has been resolved, the acquisition processing of the communication packet group related to the current data communication may be canceled (interrupted).

For example, in a case where the acquisition processing of the communication packet group related to the current data communication is started (step S31) on condition that the communication condition is the same as the communication condition of the past data communication in which the communication error of the error type "connection error" (see FIG. 5) has occurred, when connection of the current data communication succeeds, the cause of the "connection error" is determined to be resolved. For example, a connection error (port error) may be resolved by opening of a closed port (connection port) in the MFP 10 in some cases. Alternatively, a connection error caused by a temporary failure of a connection destination device (connection destination server, etc.) may be resolved by recovery of the failure of the connection destination device in some cases.

At this time, after the connection succeeds, it is assumed that the acquisition processing (and analysis processing) of the communication packet group is unnecessary, and the acquisition processing of the communication packet group may be immediately (without waiting for completion of the current data communication (step S33)) canceled. In addition, the communication packet group acquired until being canceled may be discarded (step 836).

Alternatively, in a case where the acquisition processing of the communication packet group related to the current data communication is started (step S31) on condition that the communication condition is the same as the communication condition of the past data communication in which the communication error of the error type "authentication error" (see FIG. 5) has occurred, when authentication processing in the current data communication succeeds, the cause of the "authentication error" is determined to be resolved. For example an authentication error occurred due to incorrect input of a password (incorrect input made by the user) in user authentication may be resolved by correct password input in some cases.

At this time, after the authentication succeeds, it is assumed that the acquisition processing of the communication packet group is unnecessary, and the acquisition processing of the communication packet group may be immediately (without waiting for the completion of the current data communication (step S33)) canceled. In addition, the communication packet group acquired until being canceled may be discarded (step S36).

The same applies to other types of communication errors.

<Exceptional Operation after Error Cause Resolution (Non-Start of Packet Acquisition)>

Moreover, in each of the above-described embodiments and the like, after a communication error has occurred at a certain time point in the past, the acquisition processing of the communication packet group is performed in the data communication having the communication condition same as that in past data communication D2 in which the communication error has occurred. The acquisition processing of the communication packet group related to the data communication having the same communication condition is repeatedly executed until a communication error occurs again in the data communication having the same communication condition. However, the present invention is not limited thereto.

In a case where it is determined that a cause of one error occurred in the past data communication D2 (more specifically, error cause of the type same as the error type of the one error) has already been resolved at the present time point, even if current data communication (new data communication) D1 has the communication condition same as that of the past data communication D2, acquisition of the communication packet group may not be started (acquisition processing of the communication packet group may not be performed) in the new data communication D1. In other words, even in a case where communication conditions E1 and E2 are determined to be the same with respect to at least one predetermined item, when it is determined that the cause of the one error has already been resolved, the acquisition processing of the communication packet group may not be started in the new data communication D1.

For example, after the communication error of the error type "connection error" (see FIG. 5) has occurred in the past data communication D2, when the "connection" succeeds while another past data communication D3 having a communication condition same as the communication condition of the past data communication D2 is performed, it is determined that the cause of the "connection error" (error of the error type of the past data communication D2) has been resolved.

At this time, after the "connection" succeeds, it is assumed that the acquisition processing of the communication packet group is unnecessary, and the acquisition processing of the communication packet group in the next and subsequent data communication (more specifically, the next and subsequent data communication having the communication condition same as the communication condition of the past data communication D2) (D1, etc.) may not be performed. Specifically, in the data communication D3 in which the "connection" has succeeded (another past data communication D3 after the past data communication D2), the value "invalid" only needs to be recorded in the "status" column of the corresponding data record in the error history information 210 (immediately after the connection has succeeded, etc.). Thereafter, when the operation illustrated in FIG. 3 or the like is performed with respect to the new data communication D1, the data record in which the value "invalid" is recorded in the "status" column only needs to be excluded from the target of the comparison processing in steps S13 (FIG. 3) and S53 (FIG. 6).

Likewise, after the communication error of the error type "authentication error" (see FIG. 5) has occurred in the past data communication D2, when the "authentication" succeeds while mother past data communication D3 having the communication condition same as the communication condition of the past data communication D2 is performed, it is determined that the cause of the "authentication error" has been resolved.

At this time, after the "authentication" succeeds, it is assumed that the acquisition processing of the communication packet group is unnecessary, and the acquisition processing of the communication packet group in the next and subsequent data communication (more specifically, the next and subsequent data communication having the communication condition same as the communication condition of the past data communication D2) (E1, etc.) may not be performed. Specifically, in the data communication D3 in which the "authentication" has succeeded (another past data communication D3 after the past data communication D2), the value "invalid" only needs to be recorded in the "status" column of the corresponding data record in the error history information 210 (immediately after the authentication has succeeded, etc.). Thereafter, when the operation illustrated in FIG. 3 or the like is performed with respect to the new data communication DE the data record in which the value "invalid" is recorded in the "status" column only needs to be excluded from the target of the comparison processing in steps S13 (FIG. 3) and S53 (FIG. 6).

The same applies to other types of communication errors.

<Exceptional Operation after Acquisition of Measure to Eliminate Error (Non-Start of Packet Acquisition)>

Moreover, in each of the above-described embodiments, even in a case where the contents of both of the communication conditions E1 and E2 are determined to be the same with respect to at least one predetermined item, when it is determined that a measure to eliminate one error occurred in the past data communication having the communication condition E2 has already been obtained, the acquisition processing of the communication packet group related to the new data communication D1 may not be executed.

In other words, even in a case where the cause of the one error has not actually been resolved, when the measure to eliminate the one error has already been obtained, the acquisition processing of the communication packet group may not be executed in the data communication (E1, etc.) having the communication condition same as that of the past data communication D2 in which the one error has occurred. The acquisition processing of the communication packet group is not executed when the measure to eliminate the one error has already been obtained and analysis processing of the communication packet group is unnecessary, which is efficient.

For example, a cause of a specific error (e.g., specific connection error at the time of using a specific protocol) caused by a malfunction of firmware (firmware executed in the MFP 10) of a certain version ("version 1") may be determined and new firmware ("version 2") that has taken countermeasures against the cause may be provided in some cases. In such a case, even if the specific error occurs, the specific error can be eliminated by the firmware being updated. That is, a measure to eliminate the specific error may have been already obtained in some cases.

In such a situation, acquisition of the communication packet group is not required for determining a cause of the specific error or the like.

In view of the above, in the new data communication having the communication condition same as that of the past data communication in which the specific error has occurred as well, the acquisition processing of the communication packet group may not be executed. Hereinafter, such a mode will be described with reference to FIG. 11 and the like.

Figure 11:
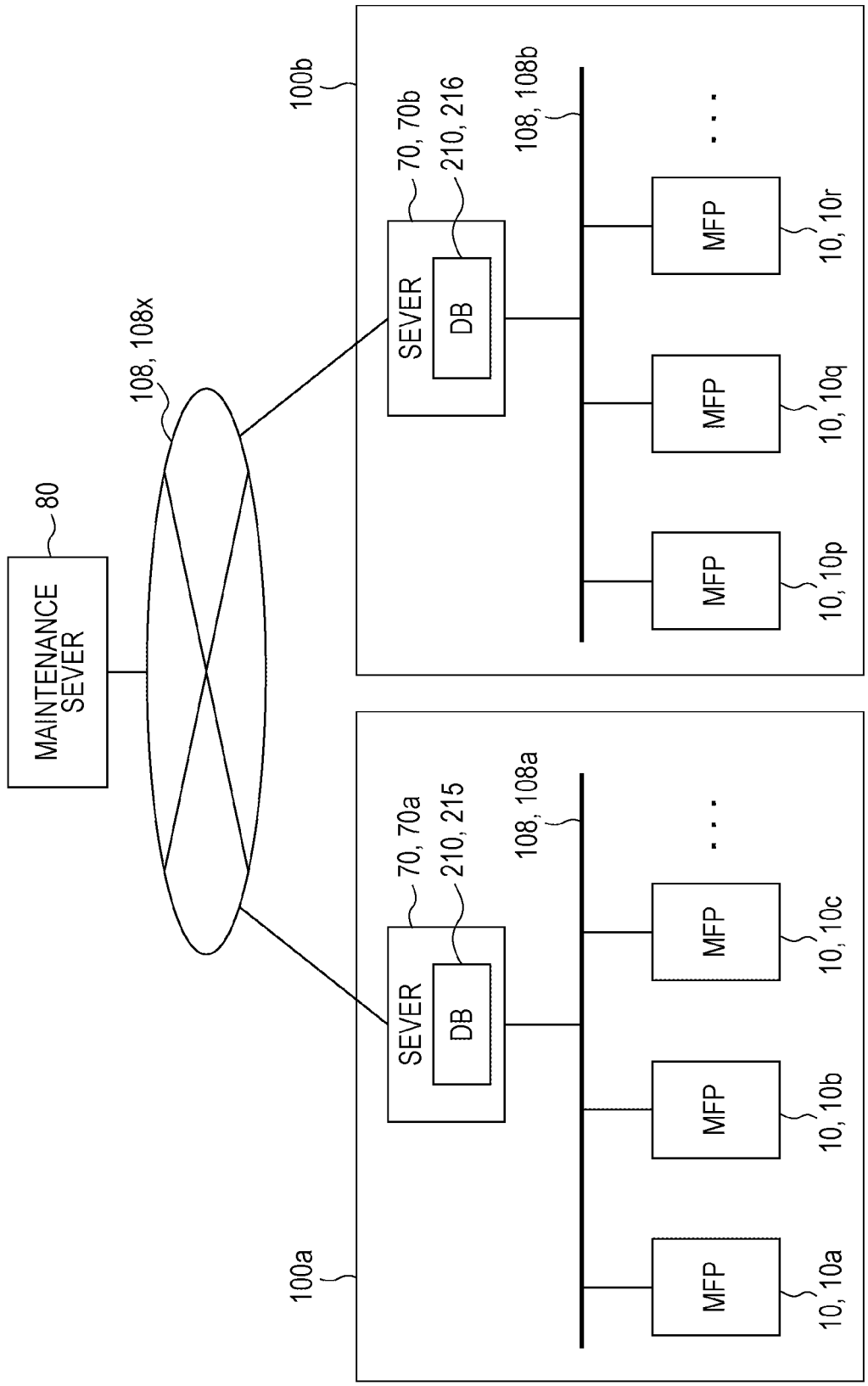
FIG. 11 is a diagram illustrating a communication system according to still another variation.

FIG. 11 is a diagram illustrating a communication system 1 (1D) including two subsystems 100a and 100b.

Each of the subsystems 100a and 100b has a configuration similar to that of the system 1 (1B) in FIG. 9, For example, the subsystem 100a is set up in a certain company, and the subsystem 100b is set up in another company.

Specifically, the subsystem 100a includes a server (in-house server, etc.) 70a, and a plurality of MFPs 10 (10a, 10b, 10c, etc.). In the server (in-house server, etc.) 70a, the error history information 210 (215), information associated with the communication packet group acquired at the time of abnormality occurrence communication, and the like are stored.

Likewise, the subsystem 100b includes a server (in-house server, etc.) 70b, and a plurality of MFPs 10 (10p, 10q, 10r, etc.). In the server (in-house server, etc.) 70b, the error history information 210 (216), information associated with the communication packet group acquired at the time of abnormality occurrence communication, and the like are stored.

Further, the communication system ID also includes a maintenance server 80 (high-order server of the server 70). The maintenance server 80 can communicate with each server 70 (70a and 70b) in each subsystem 100a and 100b via a network 108 (108x).

Information stored in each server 70 (error history information 210, information associated with the communication packet group acquired at the time of the abnormality occurrence communication, etc.) is transmitted from each server 70 (periodically or irregularly) to the maintenance server 80, and stored therein.

Further, various kinds of information is aggregated in the maintenance server 80. More specifically, presence/absence of the measure to eliminate the various kinds of errors and the like are recorded. For example, it is recorded that a certain error is resolved by introducing new firmware ("version 2") that has taken countermeasures against the cause.

Then, for example, operation similar to that in each of the above-described embodiments and the like is performed in the MFP 10a of the subsystem 100a, and when one error is detected first, information associated with the one error is recorded in the error history information 210. Specifically, "valid" is recorded in the "status" column of the error history information 210 (215).

In this variation, at this time, the server 70a first makes an inquiry to the maintenance server 80 as to whether the measure to eliminate the one error has already been obtained. More specifically, in addition to the data record including the information associated with the communication condition at the time of occurrence of the one error (see FIG. 5), version information of the firmware installed in the MFP 10a in which the one error has occurred (e.g., "version 1", etc.), and model information of the MFP 10 (model number information, etc.) are also transmitted from the server 70 to the maintenance server 80.

Then, it is determined whether the measure to eliminate the one error specified by those kinds of information has already been acquired by the maintenance server 80, and the determination result is returned to the server 70a (inquiry source device). For example, when the one error is a specific type of error ("specific connection error at the time of using a specific protocol"), and the old version of firmware ("version 1") is installed in the MFP 10a (error occurrence device) without the new (improved) version of the firmware ("version 2") being installed, it is determined that the measure to eliminate the one error has already been determined.

When the result of the determination that the measure to eliminate the one error has already been determined is received from the maintenance server 80, the server 70a executes changing processing of the error history information 215. Specifically, the server 70a changes the "status" column of the data record of the one error to "invalid". Then, the data record in Which the value "invalid" is recorded in the "status" column only needs to be excluded from the target of the comparison processing in steps S13 (FIG. 3) and S53 (FIG. 6), In this manner, the server 70a may update execution control information (information in the status column) in the error history information 215 stored in the server 70a, and may perform control such that the acquisition processing of the communication packet group related to new data communication having the communication condition same as that at the time of occurrence of the one error is not executed in each of the plurality of MFPs 10. Note that, in this case, the server 70 preferably transmits, to the MFP 10 having the error cause (MFP in which the "version 2" firmware has not been installed), a command to make a warning display to cause the MFP 10 to make the warning display (display including a message that the firmware needs to be updated to "version 2").

According to such operation, when the measure to eliminate the one error has already been obtained, in the new data communication having the communication condition same as that in the past data communication in which the one error has occurred as well, no acquisition processing of the communication packet group is executed. In other words, when analysis processing of the communication packet group is not required, the acquisition processing of the communication packet group is not executed. Therefore, efficient acquisition processing of the communication packet group can be implemented.

Note that, although the subsystem 100*a* has been mainly described, the same applies to the subsystem 100.

In addition, although the mode in which the server 70*a* makes an inquiry to the maintenance server 80 is exemplified, it is not limited thereto. For example, each MFP 10 (10*a*, etc.) may make an inquiry to the maintenance server 80 (not via the server 70). In this case, each MFP 10 may update the contents of the error history information 210 on the basis of the inquiry result received from the maintenance server 80.

<Other Acquisition Start Timing of Communication Packet Group at Data Transmission>

In the above-described first embodiment and the like, when data transmission of a scanned image is performed as new data communication, the MFP 10 immediately starts to acquire the communication packet group (step S31) immediately after an instruction to start generating a scanned image (immediately after pressing of the start button 41), it is not limited thereto. For example, in a similar case, instead of immediately after the instruction to start generating the scanned image (immediately after the pressing of the start button), the MFP 10 starts to acquire the communication packet group after reading processing of a document is started (generation processing of the scanned image is started) in response to the instruction to start generation and immediately before the data transmission. That is, even if the start button 41 is pressed, a communication packet may not be acquired until immediately before the data transmission related to the scanned image is started. With this configuration, the communication packet related to the transmission processing of the scanned image can be properly acquired while acquisition of a communication packet related to communication other than the transmission processing of the scanned image is excluded or suppressed. Note that the acquisition of the communication packet group may be started during the reading processing of the scanned image, or may be started after the reading processing of the scanned image is complete.

<Packet Filtering Processing>

Moreover, in each of the above-described embodiments and the like, in the acquisition processing and the storage processing of the communication packet group, in principle, all of a plurality of communication packets exchanged between the MFP 10 and the external device group (one or a plurality of devices outside the MFP 10) are acquired and stored. However, it is not limited thereto, and only a part of all of the plurality of communication packets may be acquired and stored by packet filtering processing, for example. More specifically, among the plurality of communication packets, only the communication packets that match a predetermined condition set in advance (communication condition, etc.) may be acquired as a communication packet group and stored in the storage 5 or the like.

In particular, the predetermined condition set in advance preferably includes the communication condition with respect to "at least one predetermined item" used in the determination processing in step S13. For example, when a "communication destination device" is included as a comparison target item (at least one predetermined item) in the comparison processing in step S13, among all of the plurality of communication packets exchanged between the MFP 10 and the external device group in the current data communication, a communication packet group including only the communication packets in which the communication destination device matches the "communication destination device" of the communication condition E2 may be acquired and stored in the storage 5.

<Others>

Moreover, in each of the above-described embodiments and the like, although operation at the time of data transmission (first embodiment, etc.) and operation at the time of data reception (second embodiment, etc.) have been described in different modes. it is not limited thereto, and the two operations may be executed in one communication device (MFP 10, etc.). In this case, the operation according to the first embodiment or the like may be executed at the time of data transmission, and the operation according to the second embodiment or the like may be executed at the time of data reception.

Further, in the above-described second embodiment and the like, when data reception is performed as new data communication, the comparison processing (S53) is performed after the data reception is started and the acquisition of the communication packet group is started after the coidentity of the communication condition is confirmed. However, it is not limited thereto.

For example, when data reception is started as new data communication, acquisition of the communication packet group related to the communication including the new data communication may be immediately started regardless of whether the contents of both of the communication conditions E1 and E2 with respect to at least one predetermined item are the same. More specifically, in step S52 (FIG. 6). the acquisition processing of the communication packet group may be started at the same time when the data reception is started. With this configuration, communication packet loss at the start of the data communication can be suppressed. Note that, when the data transmission is performed as new data communication, operation similar to that in the above-described first embodiment and the like may be performed.

Furthermore, after the contents of at least one predetermined item with respect to the first communication condition E1 are determined after the acquisition processing of the communication packet group is started, the coidentity of the contents of both of the communication conditions E1 and E2 with respect to the at least one predetermined item may be determined, and processing corresponding to the determination result may be performed. Specifically, when the contents of both of the communication conditions with respect to the at least one predetermined item are determined to be the same, the acquisition of the communication packet group may be continued. On the other hand, when the contents of both of the communication conditions with respect to the at least one predetermined item are determined not to be the same, the acquisition of the communication packet group may be terminated (canceled) According to such operation as well, efficient acquisition processing of the communication packet group can be implemented.

Although embodiments of the present invention have been described and illustrated in detail, the disclosed embodiments are made for purposes of illustration and example only and not limitation. The scope of the present invention should be interpreted by terms of the appended claims.

What is claimed is:

1. A communication device comprising
a hardware processor that:
acquires error history information including a communication condition at a time when an error has occurred in past data communication between the communication device and an external device group and type information of the error in the past data communication;
compares, in new data communication between the communication device and one external device, a first communication condition that is a communication condition at a time of the new data communication with a second communication condition that is a communication condition at a time when one past error has occurred included in the error history information;
starts acquisition processing of a communication packet group related to the new data communication on condition that contents of both of the communication conditions with respect to at least one predetermined item are determined to be the same; and
stores the communication packet group acquired through the acquisition processing in a predetermined storage on condition that an error of a type same as an error type of the one error included in the error history information has occurred in the new data communication,
wherein in a case where data transmission is performed as the new data communication, the hardware processor starts the acquisition processing of the communication packet group before the data transmission is started.

2. The communication device according to claim 1, wherein
the hardware processor does not store, in a case where the error of the type same as the error type of the one error included in the error history information has not occurred in the new data communication, the communication packet group acquired through the acquisition processing, and discards the communication packet group.

3. The communication device according to claim 1, wherein
the hardware processor starts the acquisition processing of the communication packet group related to the new data communication on condition that a communication condition same as the second communication condition with respect to the at least one predetermined item is included and another communication packet group related to same condition abnormal communication that is another past data communication in which an error has occurred has not been stored.

4. The communication device according to claim 3, wherein
the error history information includes storage result information indicating whether or not the other communication packet group related to the same condition abnormal communication has been acquired and stored, and
the hardware processor determines, on the basis of the storage result information included in the error history information, whether or not the other communication packet group related to the same condition abnormal communication has been stored.

5. The communication device according to claim 1, wherein
the hardware processor starts the acquisition processing of the communication packet group related to the new data communication on condition that a communication condition same as the second communication condition with respect to the at least one predetermined item is included and a number of storage of another communication packet group related to at least one same condition abnormal communication that is at least one data communication executed with an error between the data communication at the time when the one error has occurred and the new data communication is less than a predetermined number of times.

6. The communication device according to claim 5, wherein
the error history information includes storage result information indicating a number of times of acquiring and storing the communication packet group related to the at least one same condition abnormal communication, and
the hardware processor determines, on the basis of the storage result information included in the error history information, the number of times of storing the other communication packet group related to the at least one same condition abnormal communication.

7. The communication device according to claim 1, wherein
the hardware processor starts the acquisition processing of the communication packet group related to the new data communication on condition that acquisition permission of a communication packet is given to the communication device.

8. The communication device according to claim 1, wherein
the hardware processor stores the communication packet group acquired through the acquisition processing in a data file provided for each data communication.

9. The communication device according to claim 8, wherein
the hardware processor records a file name of the data file and a name of a storage destination device of the data file in association with the past data communication having communication condition same as the first communication condition with respect to the at least one predetermined item in the error history information.

10. The communication device according to claim 1, wherein
the hardware processor stores, when the communication packet group acquired through the acquisition processing is stored in the predetermined storage, data recording a relationship between a communication timing of each communication packet included in the communication packet group and a progress stage of predetermined application software in the communication device.

11. The communication device according to claim 1, wherein
the hardware processor stores information associated with an execution job of the new data communication in association with the communication packet group acquired through the acquisition processing.

12. The communication device according to claim 1, wherein the hardware processor cancels the acquisition processing of the communication packet group related to the new data communication in a case where, after the acquisition processing of the communication packet group related to the new data communication is started, a cause of an error of a type same as the error type of the one error is determined to have been eliminated.

13. The communication device according to claim 1, wherein
the hardware processor does not start the acquisition processing of the communication packet group related to the new data communication in a case where, even in a case where both of the communication conditions with respect to the at least one predetermined item are determined to be the same, a cause of the one error is determined to have been eliminated.

14. The communication device according to claim 1, wherein
the hardware processor does not start the acquisition processing of the communication packet group related to the new data communication in a case where, even in a case where both of the communication conditions with respect to the at least one predetermined item are determined to be the same, a measure to eliminate the one error is determined to have been obtained.

15. The communication device according to claim 1, wherein
the at least one predetermined item includes one of a communication destination device, a communication protocol, and a port number.

16. The communication device according to claim 1, wherein
the at least one predetermined item includes a plurality of hierarchized items, and
the plurality of items includes an upper level item and a lower level item lower than the upper level item.

17. The communication device according to claim 16, wherein
the upper level item is a communication protocol, and
the lower level item is an authentication method in the communication protocol.

18. The communication device according to claim 1, wherein
in a case where data transmission of a scanned image is performed as the new data communication, the hardware processor starts the acquisition processing of the communication packet group at a timing not immediately after a generation start instruction of the scanned image but at a timing after reading processing of a document is started in response to the generation start instruction and immediately before the data transmission is started.

19. The communication device according to claim 1, wherein
in a case where data reception is performed as the new data communication, the hardware processor determines coidentity of the contents of both of the communication conditions with respect to the at least one predetermined item after contents of the at least one predetermined item in the first communication condition is determined after the data reception is started.

20. The communication device according to claim 1, wherein
the hardware processor:
in a case where data reception is performed as the new data communication, starts the acquisition processing of the communication packet group related to the new data communication regardless of whether or not the contents of both of the communication conditions with respect to the at least one predetermined item are the same;
determines coidentity of the contents of both of the communication conditions with respect to the at least one predetermined item after contents of the at least one predetermined item in the first communication condition is determined after the data reception is started;
in a case where the contents of both of the communication conditions with respect to the at least one predetermined item are determined not to be the same, terminates the acquisition processing of the communication packet group; and
in a case where the contents of both of the communication conditions with respect to the at least one predetermined item are determined to be the same, continues the acquisition processing of the communication packet group.

21. The communication device according to claim 1, wherein
the hardware processor stores, among all communication packets exchanged between the communication device and one or a plurality of devices outside the communication device, only a part of the communication packets that matches a predetermined condition set in advance in the predetermined storage as the communication packet group.

22. The communication device according to claim 1, wherein
the predetermined storage is provided in the communication device.

23. The communication device according to claim 1, wherein
the predetermined storage is provided in a predetermined external device capable of communicating with the communication device.

24. The communication device according to claim 1, wherein
the error history information is stored in the communication device.

25. The communication device according to claim 1, wherein
the error history information is stored in a predetermined external device capable of communicating with the communication device.

26. A method of controlling a communication device, comprising:
a) acquiring error history information including a communication condition at a time when an error has occurred in past data communication between the communication device and an external device group and type information of the error in the past data communication;
b) comparing, in new data communication between the communication device and one external device, a first communication condition that is a communication condition at a time of the new data communication with a second communication condition that is a communication condition at a time when one past error has occurred included in the error history information;
c) starting acquisition processing of a communication packet group related to the new data communication on condition that contents of both of the communication conditions with respect to at least one predetermined item are determined to be the same; and d) storing the communication packet group acquired through the acquisition processing in a predetermined storage on condition that an error of a type same as an error type of the one error included in the error history information has occurred in the new data communication, wherein in a case where data transmission is performed as the new data communication, acquisition processing of the communication packet group starts before the data transmission is started.

27. A non-transitory recording medium storing a computer readable program causing a computer to perform the method of controlling a communication device according to claim 26, the computer being incorporated in the communication device.

28. A communication system comprising a plurality of communication devices, wherein each of the plurality of communication device includes a hardware processor that:

acquires error history information including a communication condition at a time when an error has occurred in past data communication between the communication device and an external device group and type information of the error in the past data communication;

compares, in new data communication with one external device, a first communication condition that is a communication condition at a time of the new data communication with a second communication condition that is a communication condition at a time when one past error has occurred included in the error history information;

starts acquisition processing of a communication packet group related to the new data communication on condition that contents of both of the communication conditions with respect to at least one predetermined item are determined to be the same; and stores the communication packet group acquired through the acquisition processing in a predetermined storage on condition that an error of a type same as an error type of the one error included in the error history information has occurred in the new data communication, and each of the plurality of communication devices uses common error history information common to the plurality of communication devices as the error history information, wherein in a case where data transmission is performed as the new data communication, the hardware processor starts the acquisition processing of the communication packet group before the data transmission is started.

29. The communication system according to claim 28, wherein the error history information is provided in each of the plurality of communication devices, and when the error history information is updated in the own device, each of the plurality of communication devices causes the error history information in each of other devices to be updated to set up the common error history information.

30. The communication system according to claim 28, further comprising a server capable of communicating with the plurality of communication devices, wherein the common error history information is provided in the server, and each of the plurality of communication devices accesses the common error history information provided in the server and acquires the error history information.

31. The communication system according to claim 30, further comprising a high-order server capable of communicating with the server, wherein the server makes an inquiry to the high-order server whether or not a measure to eliminate the one error has been obtained, and when the server receives a result of the inquiry that the measure to eliminate the one error has been obtained from the upper-order server, the server updates execution control information in the error history information stored in the server, and does not cause each of the plurality of communication devices to perform the acquisition processing of the communication packet group related to the new data communication having a communication condition same as the communication condition at the time when the one error has occurred.

* * * * *